United States Patent [19]
Sakurai et al.

[11] Patent Number: 5,744,104
[45] Date of Patent: Apr. 28, 1998

[54] ELECTRICALLY HEATED CATALYTIC CONVERTER FOR AN ENGINE

[75] Inventors: Kazuhiro Sakurai, Gotenba; Koji Shimoji, Susono; Tohru Yoshinaga; Kiyohiko Watanabe, both of Okazaki, all of Japan

[73] Assignee: Toyota Jidosha Kabushiki Kaisha, Aichi, Japan

[21] Appl. No.: 392,306

[22] Filed: Feb. 22, 1995

[30] Foreign Application Priority Data

Feb. 25, 1994 [JP] Japan .................... 6-028550

[51] Int. Cl.⁶ .................................................. F01N 3/10
[52] U.S. Cl. .................. 422/174; 422/179; 422/180; 422/199; 422/221; 422/222; 219/552; 219/553
[58] Field of Search ............................... 422/174, 180, 422/179, 199, 221, 222; 174/102 P, 118; 60/300; 50/DIG. 30; 219/501, 552–553; 392/485, 488

[56] References Cited

U.S. PATENT DOCUMENTS

| | | | |
|---|---|---|---|
| 3,768,982 | 10/1973 | Kitzner et al. | 422/174 |
| 3,844,716 | 10/1974 | Noakes | 422/78 |
| 3,902,071 | 8/1975 | Horowitz | 422/186.23 |
| 5,174,968 | 12/1992 | Whittenberger | 422/174 |
| 5,177,961 | 1/1993 | Whittenberger | 422/174 |
| 5,238,650 | 8/1993 | Sheller et al. | 422/174 |
| 5,271,906 | 12/1993 | Yuuki et al. | 422/177 |
| 5,317,869 | 6/1994 | Takenchi | 422/174 |
| 5,322,672 | 6/1994 | Breuer et al. | 422/174 |

FOREIGN PATENT DOCUMENTS

| | | |
|---|---|---|
| A-3903879 | 8/1990 | European Pat. Off. . |
| 3504405A | 9/1991 | Japan . |
| 4203416A | 7/1992 | Japan . |
| 4241716A | 8/1992 | Japan . |
| 4284852A | 10/1992 | Japan . |
| 5202743A | 8/1993 | Japan . |
| 5220404A | 8/1993 | Japan . |
| 5285394A | 11/1993 | Japan . |
| 6212957A | 8/1994 | Japan . |

*Primary Examiner*—Hien Tran
*Attorney, Agent, or Firm*—Kenyon & Kenyon

[57] ABSTRACT

An electrically heated catalytic converter having a substrate for a catalyst, a rod-like metal electrode connected to the substrate, and a casing accommodating the substrate. The substrate for the catalyst is formed as a scroll-like cylindrical laminated assembly of thin metal sheets wound around the electrode. The electrode extends from the laminated assembly along the central axis, bends towards the wall of the casing and penetrates the casing. The electrode is fixed to the casing via an insulating material at the point where it penetrates the casing. When the electricity is fed to the electrode, electric current flows through the electrode to the laminated assembly, and to the casing, and heat is generated in the substrate by the electric current and the temperature of the catalyst carried by the substrate quickly reaches the activating temperature. The rod-like electrode of the present invention is formed as a hollow pipe. Since the heat mass of the hollow pipe electrode is very small compared with the solid metal rod electrode, only a small amount of the heat generated by the electric current is consumed for heating the electrode of the present invention. Therefore, a large amount of the heat generated by the electric current is used for heating the substrate for the catalyst, and the time required for heating the substrate for the catalyst is greatly reduced.

9 Claims, 26 Drawing Sheets

Fig.24
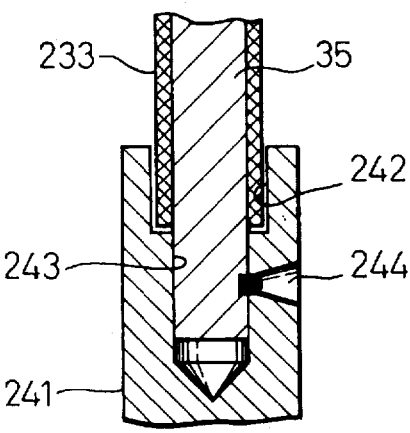
Fig.25A         Fig.25B
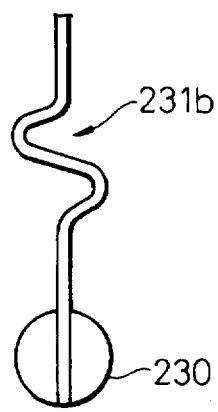    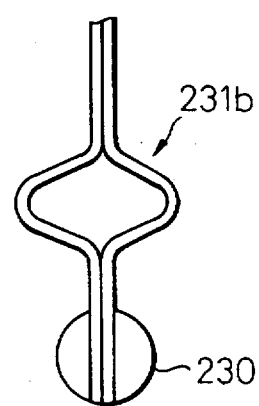
Fig.26
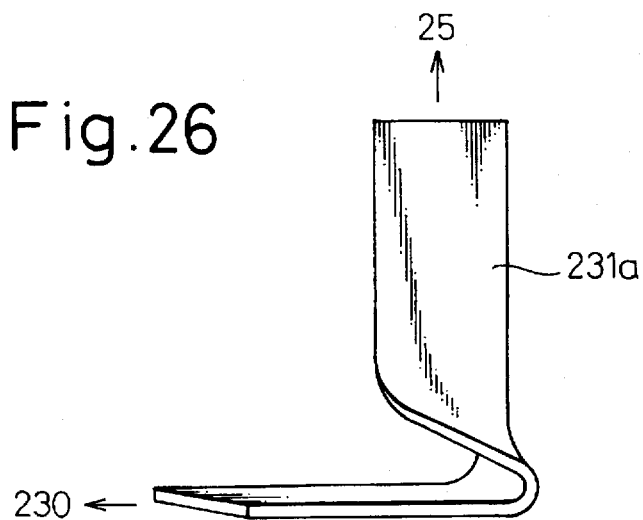

ELECTRICALLY HEATED CATALYTIC CONVERTER FOR AN ENGINE

BACKGROUND OF THE INVENTION

1. Field of the Invention

The present invention relates to an electrically heated catalytic converter having an electric heater for heating a substrate of a catalyst and, more specifically, relates to a construction of an electrode in an electric heater that electrically heats a catalytic converter.

2. Description of the Related Art

Exhaust gas purification devices that utilizes a three-way reducing and oxidizing catalytic converter disposed on the exhaust gas passage of an internal combustion engine are known. Generally, the catalyst used in such converters purifies the pollutants such as HC, CO and $NO_x$ in the exhaust gas only when the temperature of the catalyst becomes higher than a certain temperature, i.e., the catalysts in the converter do not work when the temperature of the catalyst is lower than an activating temperature.

To shorten the time required for the catalyst to reach the activating temperature after the engine. starts, electrically heated catalytic converters are used. Usually, electrically heated catalytic converters have metal substrates, and the catalyst is heated during engine start by feeding an electric current through the metal substrates, i.e., by using a part of the metal substrates as an electric heaters.

An electrically heated catalytic converter of this type is disclosed, for example, in Japanese Unexamined Patent Publication (Kokai) No. 4-203416. The electrically heated catalytic converter disclosed in JPP '416 has a substrate formed as a scroll-like cylindrical laminated assembly of thin metal sheets.

More specifically, the substrate in JPP '416 comprises a thin plain metal sheet and a thin corrugated metal sheet both provided with insulating coatings on the surfaces thereof. The plain metal sheet and the corrugated metal sheet are placed one upon another and wound around a common center electrode so that the plain metal sheet and the corrugated metal sheet form a scroll-like cylinder of laminated metal sheets. After the scroll-like laminated assembly of the metal sheets is formed, a three-way reducing and oxidizing catalyst of known type is attached to the surfaces of the thin metal sheets in each layer of the laminated assembly.

The cylindrical laminated assembly is contained in a cylindrical metal casing. The center electrode extends from the laminated assembly, in the direction of the central axis of the laminated assembly, and is bent in a radial direction so that the electrode penetrates the wall of the casing. The center electrode is fixed to the casing at the portion where it penetrates the wall of the casing, in such a manner that the electrode and the casing are electrically isolated. The cylindrical outer surface of the laminated assembly is connected to the casing in such manner that the laminated assembly and the casing are electrically connected.

When electric voltage is applied across the center electrode and the metal casing, electric current flows through the metal sheets in the laminated assembly. The metal sheets are heated by this electric current and reach the activating temperature of the catalyst a short time after the engine starts.

However, in the electrically heated catalytic converter disclosed in JPP '416, the center electrode supplying electricity to the electric heater (laminated assembly) is formed as a solid metal rod, and the heat mass of the portion of the electrode between the laminated assembly and the portion where it penetrates the casing wall is substantially large. Further, since the center electrode is connected to the heater, the heat generated by the heater and the heat transferred from the exhaust gas to the laminated assembly are also transferred to the center electrode. Therefore, a substantially large portion of the heat generated by the heater and the heat transferred from the exhaust gas is used to raise the temperature of the center electrode. This slows the temperature rise of the laminated assembly, and increases the time required for the catalyst to reach the activation temperature.

Further, a material having a low electric resistance, such as metal, is usually used for the electrode. Since materials having low electric resistance have large heat conductivies, the portion of the electrode extending outside of the casing, where an electric supply cable is connected to the electrode, reaches a high temperature during the engine operation. This high temperature at the connecting point between the electrode and the supply cable causes deterioration of the supply cable.

SUMMARY OF THE INVENTION

In view of the problems set forth above, the object of the present invention is to provide a construction of the electrode of the electric heater that electrically heats a catalytic converter which is capable of reducing the time required for activating the catalyst while reducing the temperature of the electrode at the portion connected to the electric supply cable.

The above object is achieved by an electrically heated catalytic converter of the present invention, in which the electrically heated catalytic converter comprises a substrate for a catalyst, a cylindrical casing connected to an exhaust gas passage of the engine and accommodating the substrate therein, an electric heater disposed in the casing for heating the substrate, and a rod-like electrode connected to the electric heater at one end thereof, extending from the electric heater and penetrating a wall of the casing at the other end thereof, wherein, at least a portion of the rod-like electrode including the other end of the electrode is formed as a hollow pipe.

Since at least a portion of the electrode is formed as a hollow pipe, the heat mass of the electrode becomes substantially lower than a solid electrode. Therefore, the amount of heat consumed to heat the electrode is reduced. Further, the end of the electrode which penetrates the wall of the casing and extends outside of the casing is a hollow pipe. Accordingly, the ratio of the outer surface area to the mass of the electrode is low at the portion outside of the casing. Therefore, the temperature of the electrode at the portion outside the casing and near the electric supply cable becomes lower, and thermal deterioration of the electric supply cable can be reduced.

BRIEF DESCRIPTION OF THE DRAWINGS

The present invention will be better understood from the description, as set forth hereinafter with reference to the accompanying drawings in which:

FIGS. 6 through 12A and 12B show the embodiments of the construction for the penetrating portion of the casing where the electrode penetrates the casing;

FIGS. 13 through 19A and 19B show other embodiments of the construction for the penetrating portion of the casing where the electrode penetrates the casing;

FIG. 24 is a drawing illustrating a typical construction for the connection between the cable and the solid metal rod electrode;

FIGS. 25A, 25B and 26 show other embodiments of the construction for the electrode according to the present invention;

DESCRIPTION OF THE PREFERRED EMBODIMENTS

Figure 1:
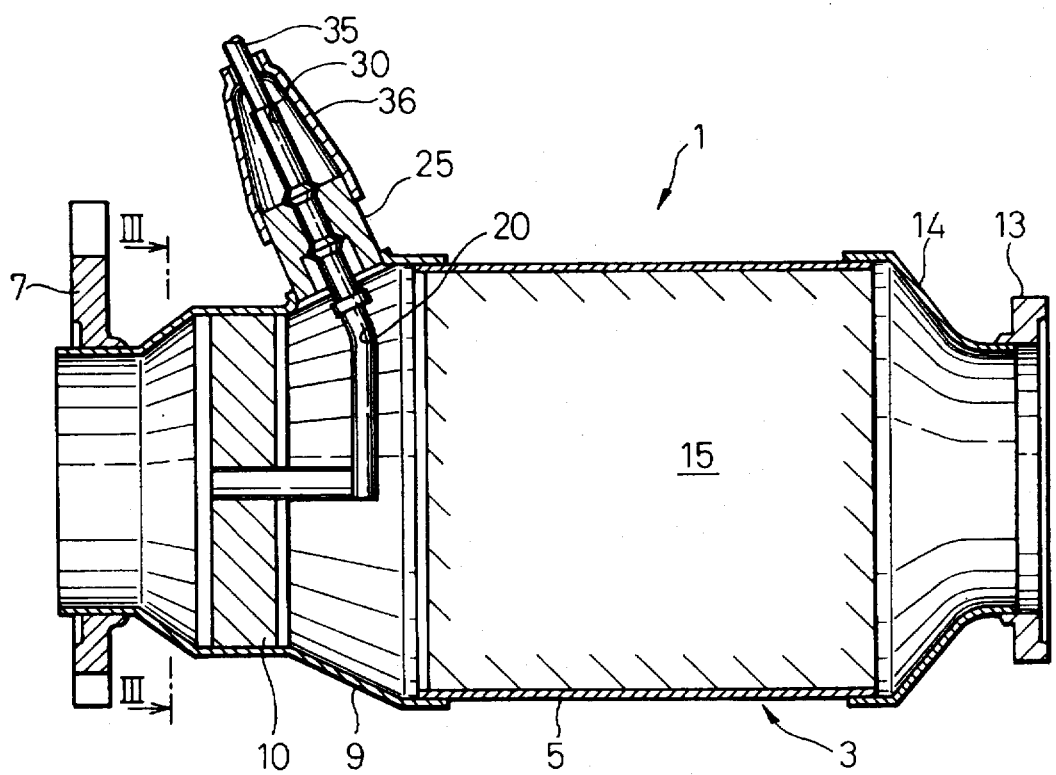
FIG. 1 is a sectional view illustrating a general construction for the electrically heated catalytic converter.

Hereinafter, the embodiments of the present invention are explained. Before explaining the respective embodiments, the construction for the electrically heated catalytic converter that is common to all the embodiments is explained with reference to FIGS. 1 through 4. The reference numerals in FIGS. 1 through 4 designate the same elements in the respective embodiments.

FIG. 1 is a typical sectional view of an electrically heated catalytic converter used for an automobile engine. In FIG. 1, reference numeral 1 designates an electrically heated catalytic converter as a whole. Numeral 3 shows a casing of the electrically heated catalytic converter 1. The casing 3 comprises a cylindrical main casing 5, an inlet casing 9 which connects the main casing 5 to an exhaust gas inlet flange 7, and an exhaust casing 14 which connects the main casing 5 to an exhaust gas outlet flange 13. The exhaust gas inlet flange 7 and the exhaust gas outlet flange 13 are connected to an exhaust gas passage of an internal combustion engine in such a manner that an exhaust gas of the engine flows through the casing 3 during the operation of the engine.

Numeral 15 in FIG. 1 designates a main converter of relatively large capacity disposed in the cylindrical main casing 5, and numeral 10 designates a heater-converter disposed in the inlet casing 9. Numeral 20 shows an electrode for supplying electricity to the heater-converter 10. The electrode 20 extends from a downstream side end of the heater-converter 10 along the central axis threreof, and is bent toward the wall of the inlet casing 9, so that the electrode 20 penetrates the wall of the inlet casing 9 at the portion 25. At the penetrating portion 25 of the casing, the electrode 20 is supported by the inlet casing 9 while maintaining electric insulation between the electrode 20 and the inlet casing 9.

An end 30 of the portion of the electrode 20 extending outside the inlet casing 9, is connected to a positive terminal of a battery through an electric supply cable 35 and a control circuit (not shown). Numeral 36 designates a protecting cover which covers the connection between the electrode 20 and the supply cable 35. The inlet casing, which is made of metal, is connected to a negative terminal of the battery through a ground terminal (not shown) fit to the inlet casing 9.

As explained later, the heater-converter 10 is formed as a scroll-like cylindrical laminated assembly of thin metal sheets, and a catalyst is attached to the surfaces of the thin metal sheets. The central portion and the outer periphery of the laminated assembly are electrically connected to the electrode 20 and the inlet casing 9, respectively, and the substrate of the heater-converter 10 acts as an electric heater when the engine starts.

The main converter 15 consists of a cylindrical monolithic substrate of ceramic or metal with a catalyst attached thereon. The heat capacity of the heater-converter 10 is substantially smaller than the heat capacity of the main converter 15.

When the engine starts, voltage is applied across the electrode 20 and the inlet casing 9 of the laminated assembly (the heater-converter) 10, and an electric currents flow through radial electric paths formed in the laminated assembly, as explained later. Thus, heat is generated by the laminated assembly (i.e., the heater-converter) 10. Since the heater-converter 10 has a small heat capacity, the temperature of the heater-converter 10 is electrically heated to the activating temperature of the catalyst a short time after the engine starts. Therefore, the exhaust gas purification by the catalyst in the heater-converter 10 begins a short time after the engine starts. Further, a relatively large amount of hydrocarbon components are contained in the exhaust gas shortly after the engine starts. Since these hydrocarbon components are oxidized by the catalyst on the heater-converter, heat is generated by the oxidation reaction of the hydrocarbon. Accordingly, when the catalyst on the heater-converter 10 is activated, the exhaust gas heated by the oxidation reaction in the heater-converter 10 flows into the main converter 15, and the main converter 15 is both heated by the high temperature exhaust gas and reaches the activating temperature of the catalyst a short time after the engine starts. Thus, the exhaust gas purification starts at both the heater-converter 10 and the main converter 15 shortly after the engine starts.

Figure 2:
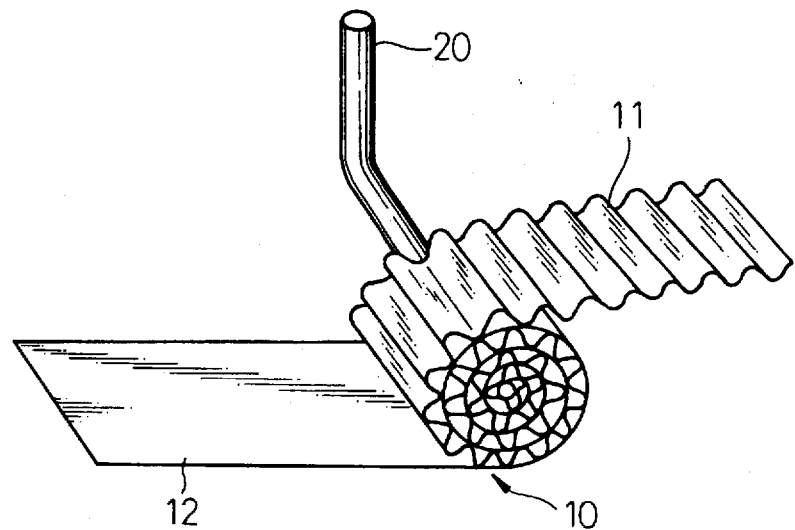
FIGS. 2 is a drawing illustrating the construction of the laminated assembly of the heater-converter.
Figure 3:
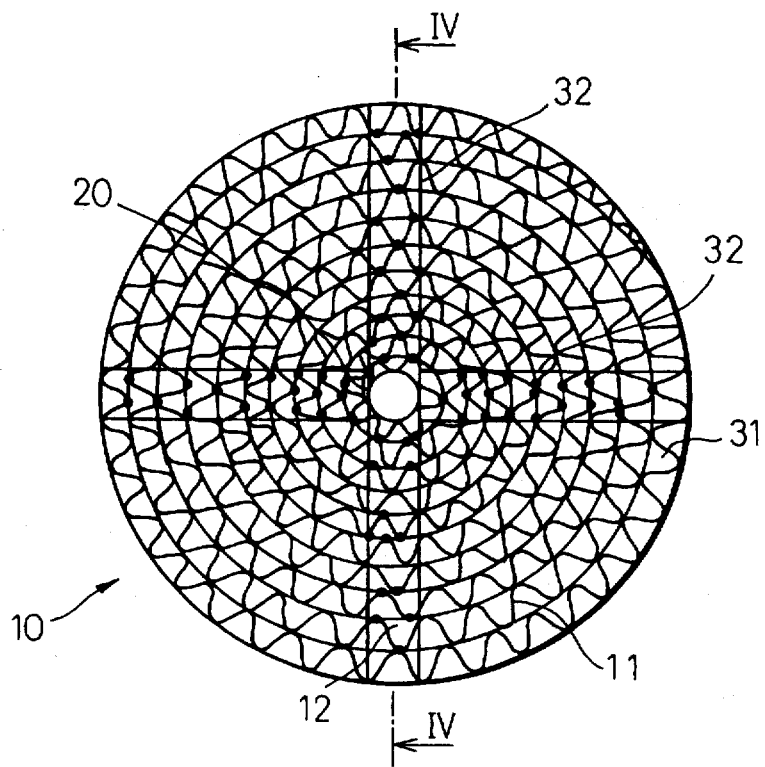
FIG. 3 is an end view of the heater-converter taken along the line III—III in FIG. 1.
Figure 4:
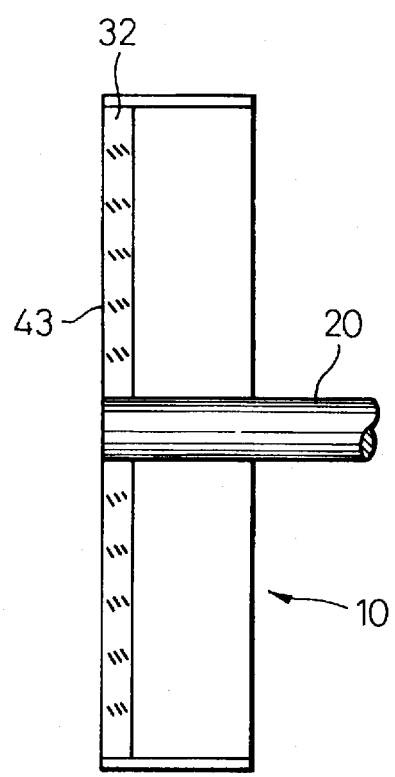
FIG. 4 is a sectional view of the heater-converter taken along the line IV—IV in FIG. 3.

FIGS. 2 through 4 show the construction for the heater-converter 10.

As shown in FIG. 2, the heater-converter 10 is formed as a scroll-like cylindrical laminated assembly of thin metal sheets in which a corrugated metal sheet 11 and a plain metal sheet 12 are placed one upon another and wound around the rod-like center electrode 20. The laminated assembly formed by the above is inserted into the inlet casing 9. The ends (i.e. the longitudinally running edges nearest to the center electrode 20) of the corrugated metal sheet 11 and the plain metal sheet 12 are connected to the electrode 20 and the outer periphery of the laminated assembly 10 is connected to the inlet casing 9.

FIG. 3 shows the sectional view of the cylindrical laminated assembly 10 taken along the line III—III in FIG. 1. Since the corrugated metal sheet 11 and plain metal sheet 12 are laminated, and wound around the electrode 20, a number of axial passages 31 are formed between the crests of the corrugated metal sheet and the plain metal sheet and are arranged in a spiral in the laminated assembly 10.

As explained later, a catalyst is attached to the surface of the metal sheets 11 and 12. When the casing 3 of the electrically heated catalytic converter 1 is connected to an exhaust gas passage of an internal combustion engine, the exhaust gas flows through the axial passages 31, and pollutants, such as HC, CO and $NO_x$, in the exhaust gas are purified by the catalyst attached to the walls of the passages 31.

Both the plain metal sheet 12 and the corrugated metal sheet 11 in FIGS. 2 and 3 are made of ferrous alloy containing aluminum (such as 75% Fe-20% Cr-5% Al alloy) and have thicknesses of approximately 50 microns. An electrically insulating coating of a metal oxide (such as aluminum oxide (alumina, $Al_2O_3$) about 1 micron thick is formed on the surface of the metal sheets 11 and 12, when forming the laminated assembly 10. Since the insulating coating of $Al_2O_3$ is also used as a carrier for the particles of the catalyst, if raw metal sheets (i.e., metal sheets having no insulating coating) are used to form the laminated assembly 10, the whole laminated assembly 10 is baked in an oxidation atmosphere after the assembly, to produce an $Al_2O_3$ layer on the surface of the metal sheets 11 and 12. The catalyst components, such as platinum Pt, rhodium Rh, and palladium Pd are impregnated into the $Al_2O_3$ layer after the laminated assembly 10 is formed.

At the upstream side end face of the laminated assembly 10, the crests of the corrugated metal sheet 11 are fixed to the plain metal sheet 12 locally so that conductive connections in which the corrugated metal sheet 11 and the plain metal sheet 12 are electrically connected are formed. The conductive connections between the corrugated metal sheet 11 and the plain metal sheet 12 are arranged in a radial direction in such a manner that radial electric paths connecting the center electrode 20 and the inlet casing 9 are formed by these conductive connections between the corrugated metal sheet 11 and the plain metal sheet 12.

The points shown by black spots in FIG. 3 indicate the conductive spots between the corrugated metal sheet 11 and the plain metal sheet 12. FIG. 3 shows four radial electric paths 32 formed by these conductive connections.

FIG. 4 shows a cross section of the laminated assembly 10 taken along the line IV—IV in FIG. 3. As shown in FIG. 4, the conductive connections 43 are formed in the laminated assembly 10 only within a certain depth from the upstream side face of the laminated assembly 10, i.e., the depth of the electric path is limited to a certain value (for example, 3 mm from the upstream side face of the laminated assembly 10).

The conductive connections 43 are formed by welding the corrugated metal sheet 11 and the plain metal sheet 12 while destroying the insulating coating thereon by, for example, laser welding. The conductive connections may be formed by soldering the corrugated metal sheet 11 and the plain metal sheet 12 using a soldering material which contains a metal component (such as zirconium Zr) having a larger reducing capacity than the metal component composing the insulating coatings (such as aluminum Al). In this case, foils of such a soldering material are interposed between the corrugated metal sheet 11 and the plain metal sheet 12 at the portions where the conductive connections are to be formed during the laminated assembly is formed, then the whole laminated assembly is baked in an oven so that the thin metal sheets are soldered while the insulating coatings are reduced by the soldering material.

By the method explained above, electric paths 32 of very narrow cross sections are formed on the upstream side face of the laminated assembly. Therefore, when electricity is fed to the laminated assembly 10, electric currents concentrate on the narrow electric paths 32 instead of flowing through the whole cross sections of the metal sheets uniformly. Thus, only the portion of the metal sheets around the electric paths, instead of the entire metal sheets, are heated by the electric currents flowing through the electric paths, and are heated up rapidly.

When the local temperatures of these portions reach the activating temperature of the catalyst (such as about 300° to 400° C.), the oxidation reaction of the HC and CO components of the exhaust gas is started immediately by the catalyst, and the heat generated by the reaction is conducted through the metal sheets, to heat up the entire laminated assembly 10. Therefore, the temperature of the entire laminated assembly 10 rises rapidly, and reaches the activating temperature of the catalyst a short time after electricity is fed to the heater-converter.

Figure 5:
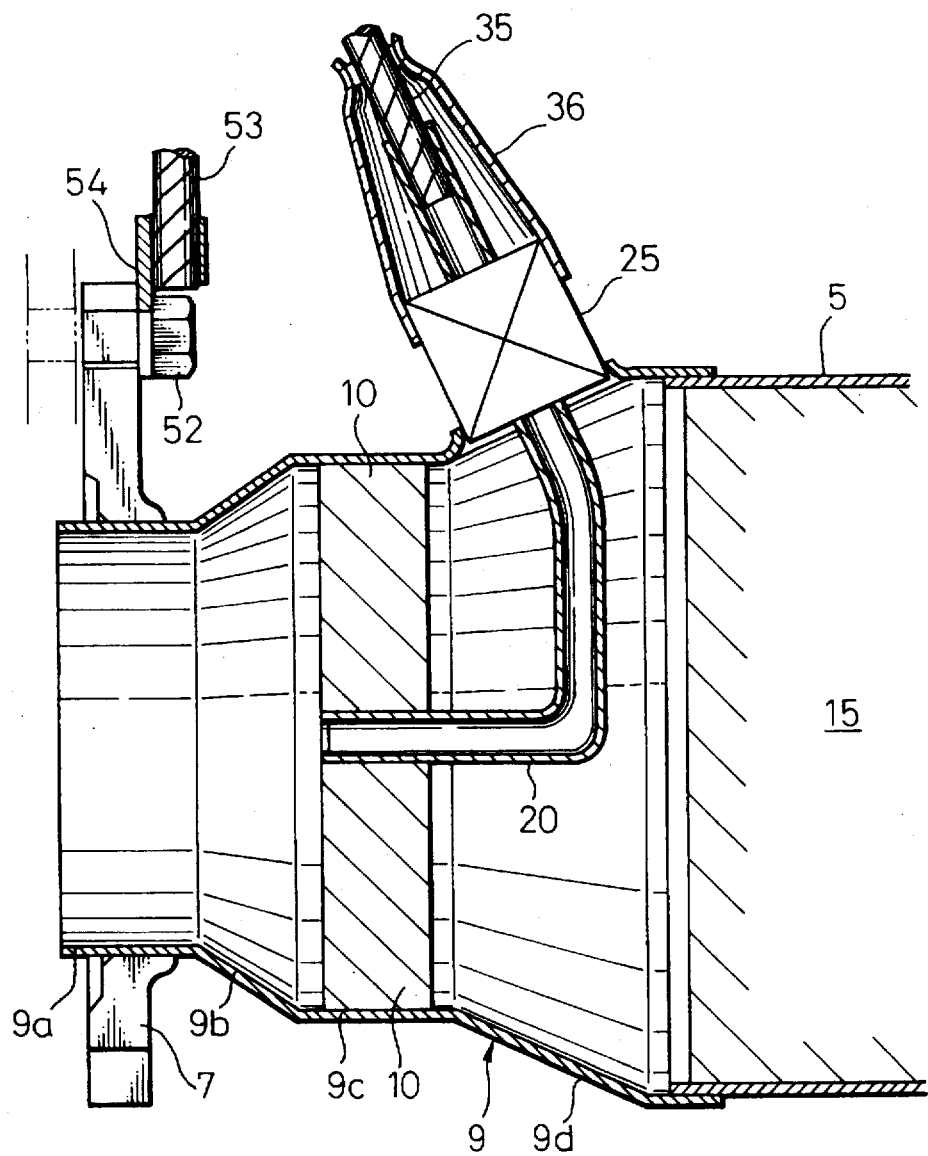
FIG. 5 is a sectional view of an electrically heated catalytic converter according to an embodiment of the present invention.

Next, an embodiment of the electrically heated catalytic converter of the present invention is explained with reference to FIG. 5. FIG. 5 shows an enlarged sectional view of the heater-converter 10 according to the present embodiment. In this embodiment, the center electrode 20 is formed as a hollow pipe of a heat resistant metal (such as a stainless steel), i.e., the center electrode 20 of the present embodiment is not formed as a rod of solid metal.

As explained above, when electricity is fed to the heater-converter (laminated assembly) 10, the oxidation reaction of the HC, CO starts at the conductive connections 43 immediately after the electricity is fed to the laminated assembly, and the heat generated by the reaction is conducted through the metal sheets to heat up the whole heater-converter 10. Therefore, to reduce the time required to heat up whole the heater-converter, it is necessary to reduce the heat mass of the whole heater-converter 10. However, if the center electrode 20 is formed as a solid metal rod, as those in the prior art, the heat mass of the center electrode 20 is substantially large compared with the heat mass of the thin metal sheets 11 and 12. Therefore, the heat mass of the heater-converter 10 becomes large as a whole, and a relatively long time is required to heat up the whole laminated assembly.

In the embodiment in FIG. 5, since the center electrode 20 is formed as a hollow pipe, the heat mass of the center electrode can be largely reduced compared with the rod of solid metal while maintaining the structural rigidity of the center electrode. Therefore, the amount of the heat consumed for heating the center electrode 20 becomes lower, and the time required for heating up the whole heater-converter 10 is reduced largely even though the heat generated by the heater-converter 10 is the same.

Further, by forming the center electrode as a hollow pipe, the ratio of the area of the surface of the electrode to the mass of the electrode becomes substantially large. Therefore, heat dissipation at the portion of the electrode extending outside the inlet casing 9, where the electrode contacts the ambient air, increases. This decreases the temperature of the electrode during the engine operation at the portion where the electric supply cable is connected. Therefore, according to the present embodiment, thermal deterioration of the electric supply cable 35 can be prevented. Further, since the center electrode 20 is formed as a hollow pipe according to the present embodiment, the electrode is lighter than a solid metal rod, therefore, the weight of the heater-converter 10 can be reduced as a whole.

Next, the construction for the penetrating portion 25 of the inlet casing 9 where the center electrode 20 penetrates the inlet casing 9 is explained. As explained before, the construction for the penetrating portion 25 must have sufficient rigidity to support the center electrode 20 against the force exerted on the electrode by the exhaust gas flow and the vibration of the converter. Further, the center electrode 20 must be electrically isolated from the inlet casing 9 at the penetrating portion 25. Also, the construction for the penetrating portion 25 must provide a complete gas seal to prevent the exhaust gas from leaking through this portion.

Figure 6:
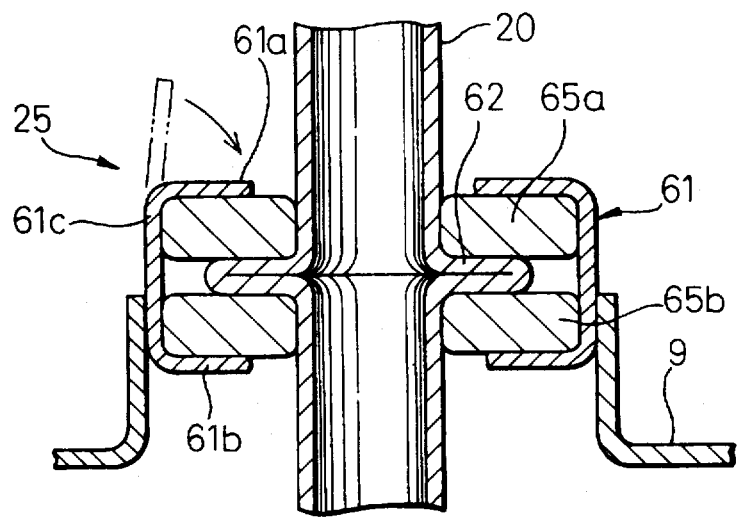

FIG. 6 shows an example of the construction for the penetrating portion 25 according to the present invention.

In FIG. 6, numeral 61 shows a cylindrical holder which is welded to the inlet casing 9 at the penetrating portion 25. Further, a flange 62 is formed on the outer surface of the electrode 20 at the penetrating portion 25. The holder 61 consists of a metal sheet formed in a cylindrical shape having upper and lower faces 61a and 61b, respectively. The upper face 61a and the lower face 61b are formed by bending the side wall of the holder. Center holes having larger diameter than the outer diameter of the center electrode 20 are provided on the upper face 61a and the lower face 61b. The inner diameter of the side portion 61c of the holder 61 is larger than the diameter of the flange 62. In this embodiment, the flange 62 of the center electrode is supported firmly by disk-like insulating members 65a and 65b made of, for example, ceramics interposed between the faces 61a, 61b and the flange 62. The disk-like insulating members 65a and 65b have center holes, the walls thereof contact the outer surface of the center electrode 20 in such a manner that a gas tight seal between the surfaces of the electrode and the insulating members is maintained Similarly, the outer peripheries of the disk-like insulating members 65a and 65b contact the inner surface of the holder 61 in such a manner that a gas tight seal between the outer peripheries of the disk-like insulating members 65a, 65b and the inner surface of the holder 61 is maintained.

When the center electrode 20 is fixed to the inlet casing 9, the holder 61 is first welded to the inlet casing at the opening of the casing wall where the center electrode 20 is to pass through. At this stage, the holder 61 is shaped so that only the lower face 61b has been formed on the holder 61 previously by bending the side wall 61c, i.e., the holder 61 has a cup-like shape having an open upper end. Then, the center electrode 20 is inserted into the holder with the insulating members placed on both sides of the flange 62, and after inserting the flange 62 and the insulating members 65a and 65b in the holder 61, the upper face 61a is formed by bending the side wall 61c of the holder 61 as shown by the dotted line in FIG. 6. The insulating members 65a and 65b are secured to the holder 61 by caulking the upper face 61a. Since the inner diameter of the center holes of the upper face 61a and the lower face 61b are larger than the outer diameter of the electrode 20 (and the diameters of the center holes of the insulating members 65a, 65b), the upper face 61a and the lower face 61b does not contact the outer surface of the electrode 20. Similarly, the outer diameter of the flange 62 is smaller than the inner diameter of the holder 61 (and outer diameters of the insulating members 65a, 65b) the outer periphery of the flange 62 does not contact the inner surface of the holder 61. Therefore, the center electrode 20 is supported firmly by the insulating members 65a and 65b without contacting the holder 61, i.e., a gas tight seal between the electrode 20 and the inlet casing 9 is obtained while maintaining the insulation between the electrode 20 and the inlet casing 9.

If a construction for the penetrating portion 25 similar to that in FIG. 6 is required in the case of a solid metal rod type electrode, the flange 62 of the electrode 20 must be machined from the solid metal rod integrally with the electrode 20, or the flange 62 must be separately machined and welded to the electrode 20. In this embodiment, since a hollow pipe is used for the electrode 20, the flange 62 of the electrode 20 can be easily formed by press forming without machining the surface of the electrode. Therefore, amount of the work required for manufacturing the electrode is largely reduced.

Figure 7:
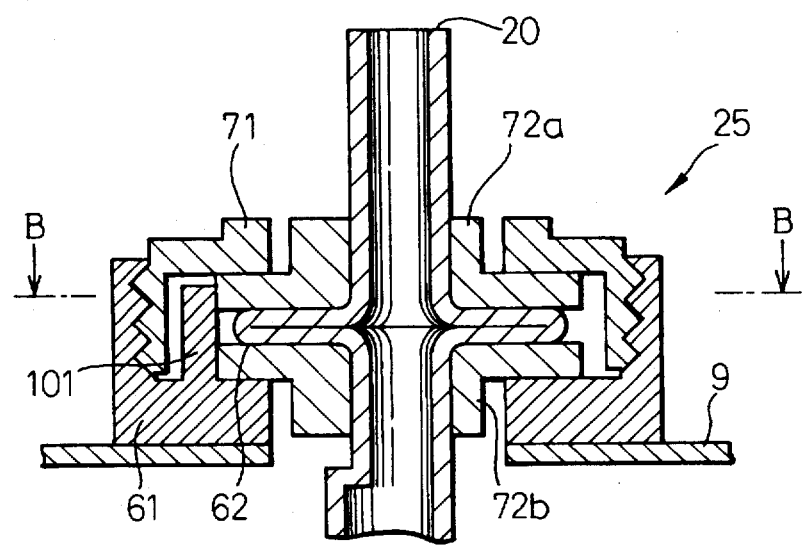

FIG. 7 shows another example of the construction for the penetrating portion 25. During the operation of the engine, complicated combinations of the forces generated by, for example, vibration, exhaust gas flow and thermal expansions of the elements are exerted on the center electrode 20. Frequently, these forces act on the center electrode 20 in such a manner that a moment for rotating the center electrode acts on the penetrating portion 25. Therefore, when the electrode is fastened to the inlet casing by fastening members such as nuts, the moment sometimes acts on the fastening members so that these fastening members are loosened by the moment.

FIG. 7 shows a construction for the penetrating portion 25 using lock nuts for the fastening member which is capable of preventing the fastening member from being loosened by the moment exerted on the electrode 20.

In FIG. 7, numeral 61 shows a cylindrical holder which is welded to the inlet casing 9. In this embodiment, threads are cut on the inner surface of the holder 61, and a cap nut 71 having outer threads thereon is screwed into the holder 61. Further, a flange 62 similar to that in FIG. 6 is formed on the hollow electrode 20, and the electrode 20 is fixed on the inlet casing by screwing the cap nut 71 into the holder 61 with interposing insulating members 72a and 72b made of a ceramic material such as alumina $Al_2O_3$ on both sides of the flange 62. Similar to the embodiment in FIG. 6, the outer diameter of the flange 62 is smaller than the outer diameters of the insulating materials 72a and 72b, and the outer periphery of the flange 62 does not contact the inner surface of the cap nut 71 and the holder 61.

Figure 8:
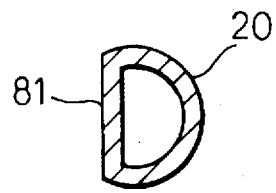
Figure 9:
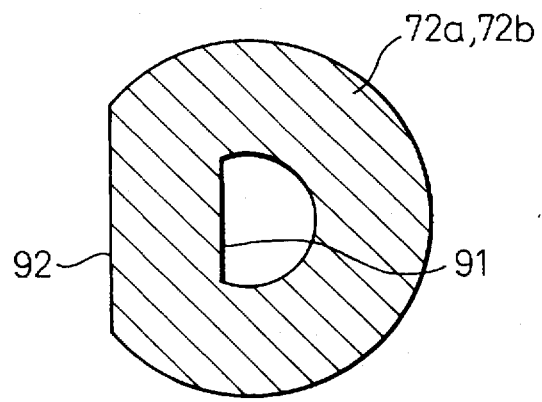
Figure 10:
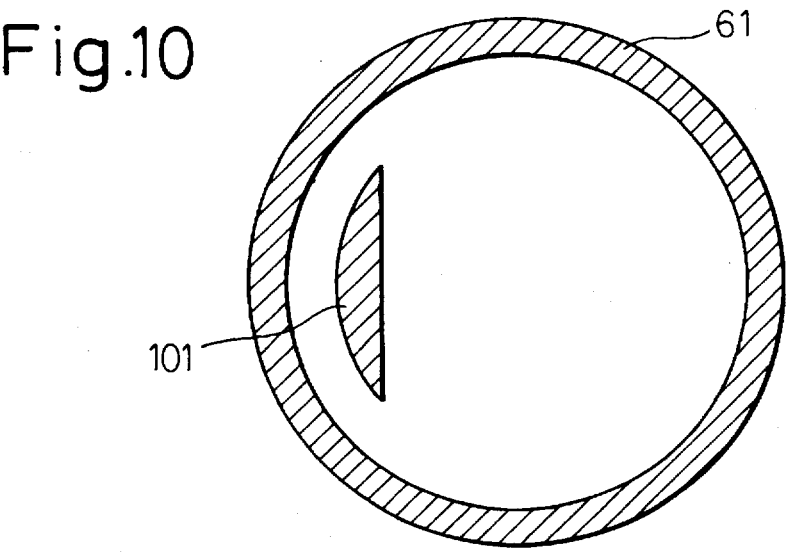

In this embodiment, loosening of the cap nut 71 is prevented by the mechanism explained hereinafter. FIGS. 8, 9 and 10 show cross sections of the electrode 20, insulating material 72a, 72b and the holder 61, respectively, taken along the line B—B in FIG. 7. As seen from FIG. 8, the cross section of the electrode 20 at the penetrating portion 25 is not a circle, but a flat portion 81 for locking the insulating members 72a and 72b. Further, as seen from FIG. 9, also a flat portion 91 for engaging the flat portion 81 of the electrode 20 is formed on the inner surfaces of the insulating members 72a and 72b. In addition to the above flat portion 91, a part of the outer peripheries of the insulating members 72a and 72b are cut off so that another flat portion 92 is formed. In the holder 61, a projection 101, which has a flat portion for engaging the flat portions 92 of the insulating members 72a and 72b, is provided.

In order to secure the electrode 20 to the penetrating portion 25 of the casing 9, the electrode 20 is inserted into the center holes of the insulating members 72a and 72b in such a manner that the flat portion 81 of the electrode 20 engages the flat portions 91 of the center hole of the insulating members 72a and 72b. Then, the electrode 20, together with the insulating members 72a, 72b are inserted into the holder 61 in such a manner that the flat portions 92 on the outer peripheries of the insulating members 72a and 72b engage the projection 101 inside the holder 61. Then the cap nut 71 is screwed into the holder 61 to clamp the insulating members 72a, 72b and the flange 62.

Since the insulating members 72a and 72b are prevented from rotation by the engagement between the flat portions 92 and the projection 101, and the electrode 20 is also prevented from rotation by the engagement between the flat portions 92 of the insulating members 72a, 72b and the flat portion 81 of the electrode 20, the cap nut 71 is not loosened even if a rotating moment is exerted on the center electrode 20.

Figure 11:
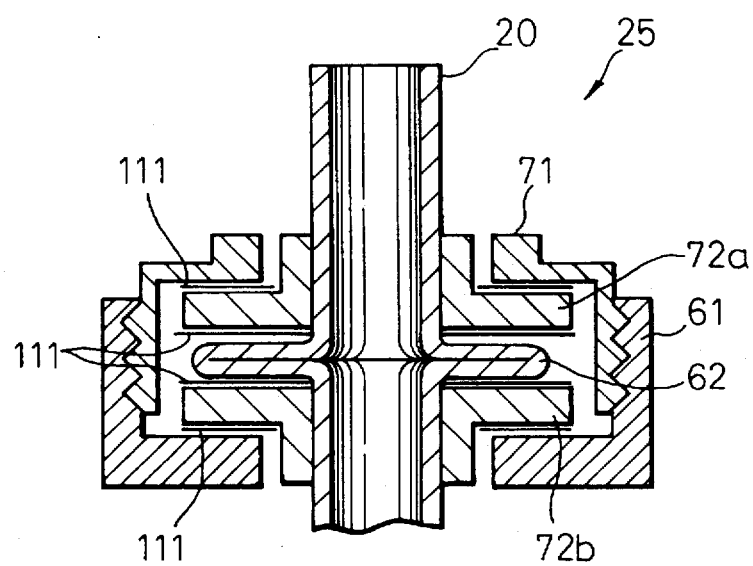

FIG. 11 shows another embodiment for preventing the cap nut 71 from loosening, in which flat portions 81, 91, 92 and the projection 101 in FIGS. 8 through 10 are not required.

In the embodiment shown in FIG. 11, the cross section of the center electrode 20, insulating members 72a, 72b are formed as a circle, i.e., no flat portions are formed. However, in this embodiment, flexible thin metal plates 111 (for example, stainless steel plates of 30 to 100 microns thick) are interposed between the cap nut 71 and the insulating member 72a, the insulating member 72a and the flange 62, the flange 62 and the insulating member 72b, and between the insulating member 72b and the holder 61, respectively. When the insulating members 72a and 72b are used for supporting the electrode, it is required to set the tightening torque of the cap nut 71 low in order to prevent cracking of the cap nut 71 from occurring. This tends to cause the cap nut 71 to loosen. In this embodiment, the tightening torque of the cap nut 71 can be increased without causing cracking of the insulating members 72a and 72b, since the flexible thin metal plates 111 interposed between the respective members act as buffers. Therefore the cap nut 71 can be tightened with sufficient tightening torque to prevent loosening in this embodiment by a simple construction for the penetrating portion. To achieve a good buffer effect, it is preferable to interpose a plurality of thin metal sheets (for example 2 to 3 sheets) between the respective members, however even if a single sheet is interposed between the respective members, the loosening of the cap nut 71 can be prevented.

Though a hollow pipe electrode 20 is used in the embodiments in FIGS. 7 through 11, these constructions for the penetrating portions can be also used for solid metal rod electrode.

Next, another embodiment of the construction for the penetrating portion 25 is explained with reference to FIGS. 12A and 12B. In the embodiments in FIGS. 6 through 11, the insulation and the gas seal capabilities at the penetrating portion 25 are obtained by fixing the electrode 20 to the holder 61 using insulating members made of, for example, ceramics. However, the insulating members of ceramic tend to crack or break easily. In the embodiment in FIGS. 12A and 12B, the electrode 20 is fixed to the holder 61 without using ceramic insulating members.

Figure 12A:
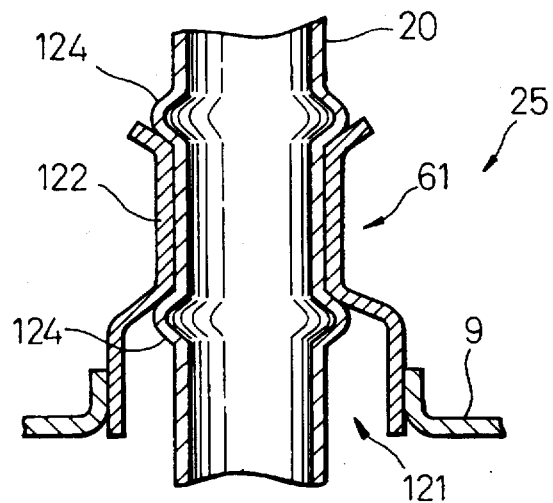
Figure 12B:
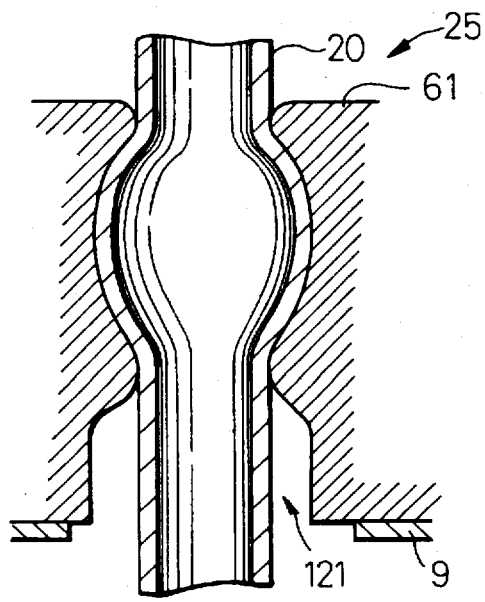

In FIG. 12A, the holder 61 is formed by expanding a portion of a metal pipe. Namely, the diameter of an end portion of the holder 61 which is to be connected to the inlet casing 9 is expanded by pressing in such a manner that a cavity 121 having an inner diameter larger than the outer diameter of the electrode 20. On the other hand, the inner diameter of a straight pipe portion 122 of the holder 61 is slightly larger than the outer diameter of the electrode 20. Further, after expanding the end portion thereof, an insulating coating is formed on the inner surface of the holder 61 by the process explained below. Then, after the hollow pipe electrode 20 is inserted into the expanded holder 61, the diameter of the electrode 20 is also expanded in such a manner that the outer surface of the electrode 20 contacts tightly the inner surface of the straight pipe portion 122 of the holder 61 and that the flanges 124 are formed on the outer surface of the electrode 20 at both ends of the straight pipe portion 122 of the holder 61. By the procedure explained above, the electrode 20 is firmly fixed to the holder 61 by the tight contact between the outer surface of the electrode 20 and the inner surface of the holder 61, further, a tight seal between the outer surface of the electrode 20 and the inner surface of the holder 61 is obtained.

The insulating coating formed on the inner surface of the holder 61 is required to have a good persistence to the material of the holder 61 to ensure the insulation capability and the gas sealing capability, and, for example, a coating of TiCN, TiN or $Al_2O_3$ formed by a chemical vapor deposition method (CVD) is preferable. Alternatively, if the holder 61 is made from ferrous alloy containing aluminum (such as 75% Fe-20% Cr-5% Al alloy), the insulating coating of $Al_2O_3$ may be formed by baking the holder 61 in an oxidation atmosphere (for example, at the temperature between 1100° C. and 1300° C. for 1 to 3 hours). By baking the holder 61, particles of aluminum oxide ($Al_2O_3$) are precipitated from the ferrous alloy and the entire surface of the holder 61 is coated by these particles.

The diameter of the hollow pipe electrode 20 may be expanded, for example, by exerting a compression stress along the pipe axis, or, by exerting an internal pressure on the electrode 20 using a fluid or elastic material such as urethane.

Further, the holder 61 is not necessarily formed from a metal pipe, instead, the holder 61 may be formed from a solid metal block by machining. Also, the portion of the holder 61 which contacts the outer surface of the electrode 20 may have a shape other than a straight pipe. For example, the portion may be formed as spindle-like shape which has a swelled middle portion as shown in FIG. 12B, or, as a shape having swelled portions at both ends (not shown). In addition to that, if the flanges such as indicated by numeral 124 in FIG. 12A are formed on both ends of the spindle-shaped portion (or the portion having swelled portions at both ends), the sealing capability and the structural rigidity of the penetrating portion can be further increased.

Figure 13:
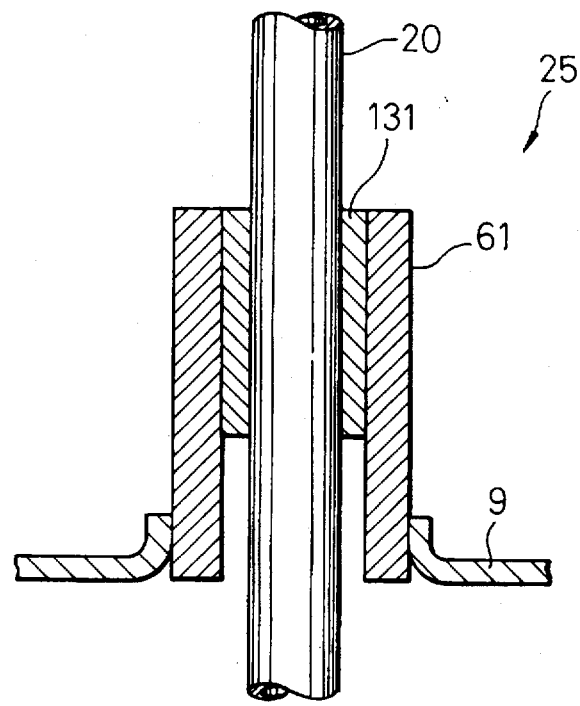
Figure 14:
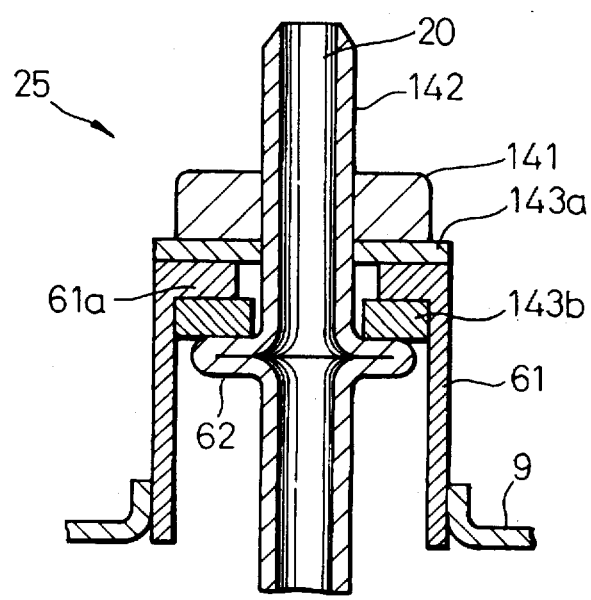

FIGS. 13 and 14 show other embodiments of the constructions for the penetrating portion 25 in which the electrodes 20 are isolated from the inlet casing 9 by an insulating coating.

In FIG. 13, the holder 61 is formed as a straight pipe, and the electrode 20 is fit to the holder 61 via a cylindrical metal spacer 131. In this embodiment, an insulating coating is formed on at least one of the surfaces of the members 61, 131 and 20 which contacts the surface of another member using the method explained above. The electrode 20 is fit to the spacer 131, and the spacer 131 is fit to the holder 61 after the insulating coating is formed by, for example, a press fitting, shrink fitting or soldering, and so forth. According to the construction for the penetrating portion 25 in FIG. 13, the electrode 20 can be firmly fixed to the holder 61. Further, since high accuracy can be maintained in the dimensions of the respective members, the gas seal capabilities between the contact surfaces of the respective members can be improved. If the insulating coating is formed on the surfaces of more than one member, a positive insulation between the electrode 20 and the inlet casing 9 can be obtained.

FIG. 14 shows a construction for the penetrating portion 25 which secures the electrode 20 by a fastening nut 141. In this embodiment, a flange 62 is formed on the electrode 20, and the holder is provided with an upper cover 61a having a center hole through which the electrode 20 extends. Further, a thread is cut on the outer surface of the electrode 20 to screw the nut 141. A metal spacer 143a is inserted between the nut 141 and the upper cover 61a, and another metal spacer 143b is inserted between the upper cover 61a and the flange 62. The electrode 20 is fixed to the holder 61 by tightening the nut 141 in such a manner that the spacers 143a, 143b and the upper cover 61a are clamped between the nut 141 and the flange 62. In this embodiment, the insulating coatings 142 are applied to the surfaces of the electrode 20, the holder 61 and the nut 141, or alternatively, on the surfaces of the spacers 143a and 143b by the method explained above. Therefore, the electrode 20 is isolated from the holder 61. The advantage of the construction for the penetrating portion in this embodiment is that a large tightening torque can be applied to the nut 141 since the insulating members (i.e., the spacers 143a and 143b) are made of metal so that the loosening of the nut 141 can be prevented and the sealing capability of the contact surfaces of the members can be increased.

Figure 15:
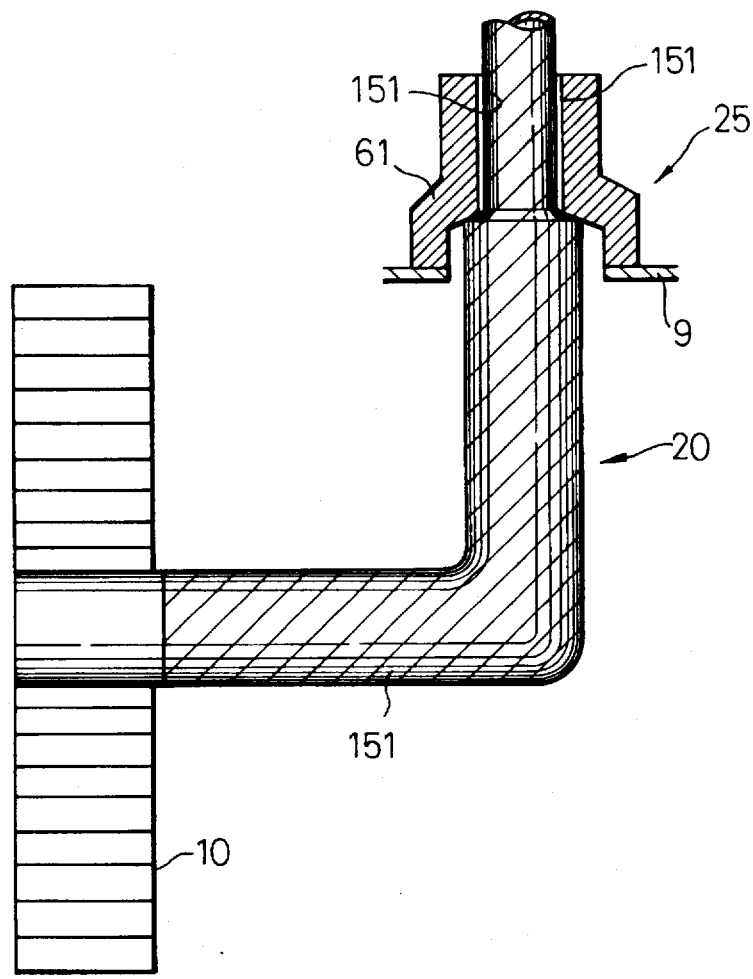

FIG. 15 shows an embodiment of the electrode 20 in which not only the portion of the surface of the electrode contacting the holder 61 but a whole surface (indicated by hatched area in FIG. 15) of the electrode 20 is provided with an insulating coating 151. In this embodiment the insulating coating 151 acts as an insulator preventing the heat transfer from the exhaust gas to the electrode 20 in addition to an insulator which electrically isolates the electrode 20 from the holder 61. For this purpose, the insulating coating 151 is composed of ceramic and applied on the surface of the electrode 20 by a thermal jet method so that a coating thicker than those explained in FIGS. 12A through 14 is obtained. The electrode 20 is fixed to the holder 61 by one of the methods explained in FIGS. 12A through 14.

Since the insulating coating 151 is applied on the surface of the electrode 20 at the portion contacting the exhaust gas, the heat quantity transferred from the exhaust gas to the electrode during the engine operation is reduced. Therefore, by applying the insulating coating on the whole surface of the electrode 20 in addition to forming the electrode by a hollow pipe, the temperature of the electrode can be kept low during the engine operation, and the thermal deterioration of the electric supply cable connected to the electrode 20 can be reduced.

Figure 16:
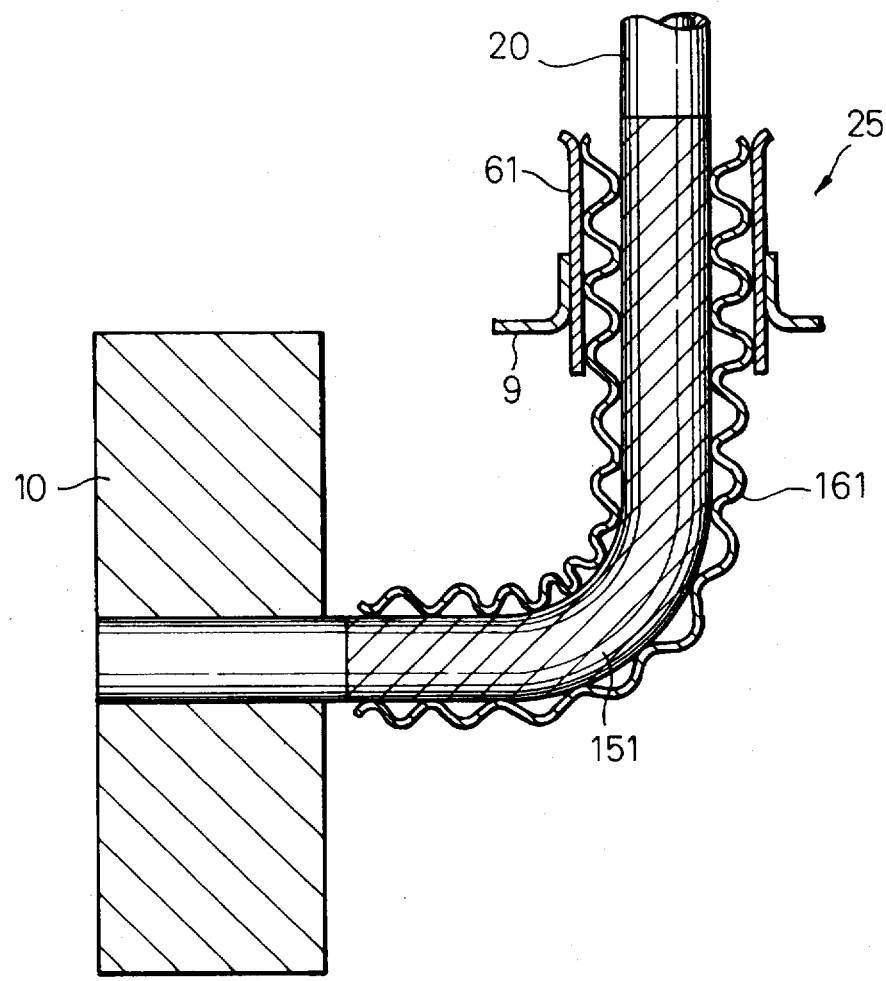

FIG. 16 shows another embodiment of the electrode having the insulating coating on the whole surface thereof. In this embodiment, the insulating coating 151 is formed on the whole surface of the electrode 20 in the similar manner as in FIG. 15. In addition to that, a bellows-like flexible tube 161 covering the electrode 20 is provided. The bellows-like flexible tube 161 is made of heat resistant metal such as stainless steel and has an inner diameter slightly smaller than the outer diameter of the electrode 20. Therefore, by force fitting the electrode 20 into the flexible tube 161, the flexible tube 161 is fixed on the electrode 20. Further, the holder 61 in this embodiment has an inner diameter slightly smaller than the outer diameter of the flexible tube 161. After force fitting, the electrode 20, together with the flexible tube 161 is pressed into the holder 61. Since the inner diameter of the holder 61 is smaller than the outer diameter of the flexible tube 161, the outer periphery of the flexible tube 161 closely contacts the inner surface of the holder 61 when the flexible tube 161 is inserted into the holder 61, and the electrode 20 is fixed to the holder 61 via the flexible tube 161. Further, a positive gas seal between the holder 61 and electrode 20 is achieved by the contacts between the flexible tube 161 and the electrode 20, and between the flexible tube 161 and the holder 61. In this embodiment, the electrode 20 is shielded from the exhaust gas by the flexible tube 161, therefore, the temperature of the electrode 20 can be maintained low. Further, according to this embodiment, the electrode 20 is supported by the flexible tube 161 in an elastic manner and a relative movement between the electrode 20 and the holder 61 is permitted by the deflection of the flexible tube 161 without affecting the gas seal capability. Therefore, it is possible to absorb the thermal expansion of the electrode 20 at the penetrating portion 25 without affecting the gas seal capability. Thus, the stress exerted on the heater-converter 10 by the thermal expansion of the electrode can be reduced.

The construction for the penetrating portion 25 which is capable of supporting the electrode 20 without rigidly restricting the movement of the electrode 20, as shown in FIG. 16, is called floating support of the electrode. In the floating support construction, the stress exerted on the laminated assembly 10 due to the thermal expansion of the electrode 20 is reduced, since the thermal expansion of the electrode is absorbed at the penetrating portion 25. Further, in the floating support construction, the assembly of the members at the penetrating portion 25 is easily done, since the differences in the dimensions of the members caused by manufacturing tolerances also can be absorbed by the floating support construction. Hereinafter, several embodiments of the floating support construction for the penetrating portion 25 are explained.

Figure 17:
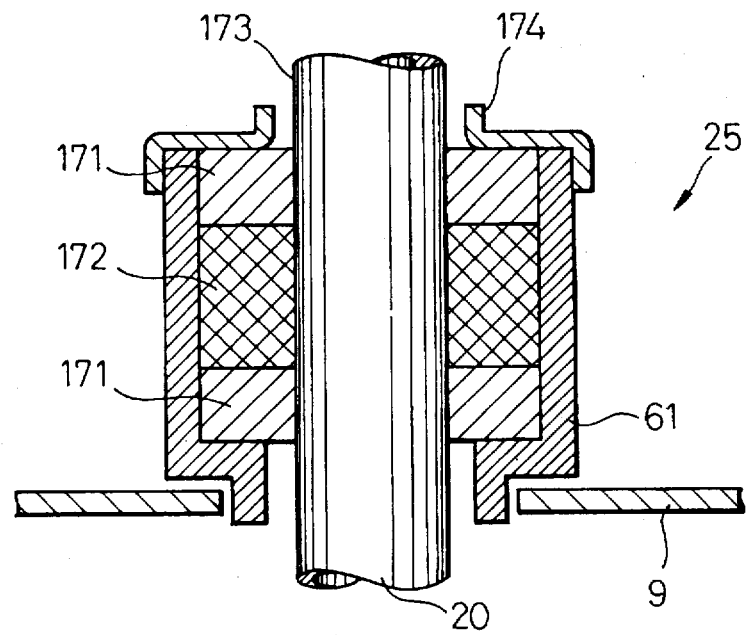

FIG. 17 shows an embodiment of the floating support construction for the penetrating portion 25 which utilizes cushion members 171 and a seal member 172. As shown in FIG. 17, the electrode 20 is formed as a straight pipe having no flange at the penetrating portion 25 and an insulating coating 173 similar to the coatings in FIGS. 12A, 12B or 15 is applied on the outer surface of the electrode 20 at the penetrating portion 25. Numeral 174 in FIG. 17 shows a cap for the holder 61 which is welded to the top of the holder 61 after placing the cushion members 171 and the seal member 172, together with the electrode 20, in the holder 61.

The cushion members 171 are made from a wad or a mesh of filaments of a heat resistant metal (such as stainless steel) which is formed into a disk-like shape having a center hole by lightly compressing the wad or mesh so that the elasticity thereof is maintained. The seal member 172 is made from a wad or a mesh of the filaments of ceramic or glass which is formed into a disk-like shape having a center hole by a similar process as the cushion members 171. The thicknesses of the cushion members 171 and the seal member 172 are selected in such a manner that when the cap 174 is fixed to the holder 61, the cushion members 171 and the seal member 172 are further compressed by the cap 174. The center hole of the cap 174 has a larger diameter than the outer diameter of the electrode 20 in order to prevent the inner edge of the cap 174 from contacting the outer surface of the electrode 20.

As shown in FIG. 17, the floating support of the electrode 20 is achieved by the cushion members 171 and the seal members 172. Further, the outer surface of the electrode 20 contacts only the cushion members 171 and the seal member 172 and does not contact hard surface of the metal members such as the cap 174 and the holder 61. Therefore, the persistence of the insulating coating on the outer surface of the electrode 20 is increased. Further, since the seal member 172 is placed between the cushion members 171, foreign matter from the outside of the holder 61 such as mud or water, as well as pulsation of the exhaust gas pressure does not reach the seal member 172. Thus the deterioration of the seal member 172 can be prevented.

Figure 18:
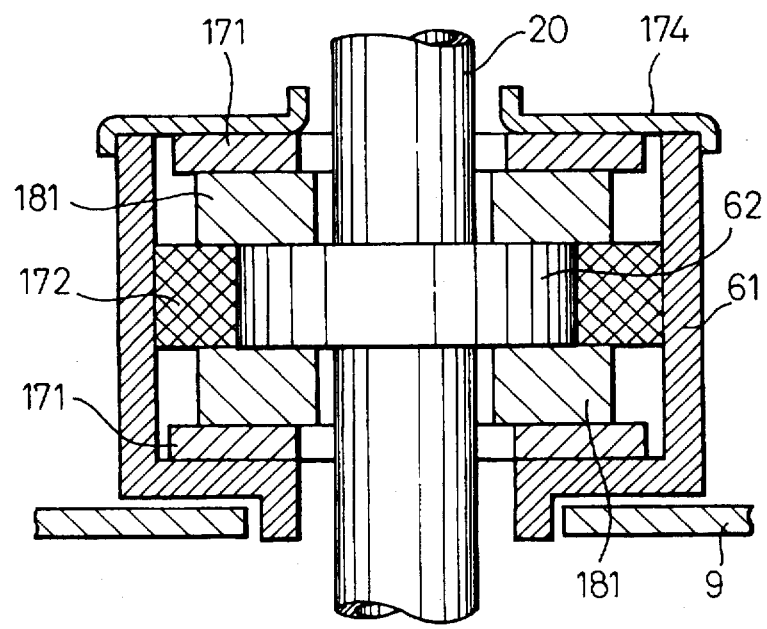

FIG. 18 shows another embodiment of the floating support construction for the penetrating portion 25 which utilizes a flange 62 formed on the outer surface of the electrode 20 and the holder 61 and the cap 174 similar to the embodiment in FIG. 17. In this embodiment, the insulating coating is not applied on the surface of the electrode 20, and the electrode 20 is electrically isolated from the holder 61 by porcelain insulators 181 placed on both sides of the flange 62. Further, cushion members 171 similar to those in FIG. 17 are placed between the flange 62 and the cap 174 and the bottom of the holder 61. A seal member 172 is disposed between the outer periphery of the flange 62 and the inner surface of the holder 61. Though the porcelain insulators 181 are used to isolate the electrode 20 from the holder 61, the stress caused by the vibrations or thermal expansion of the respective members is absorbed by the cushion members 171 and the seal member 172. Therefore, the damage to the porcelain insulators 181 caused by excessive stress can be prevented.

Figure 19A:
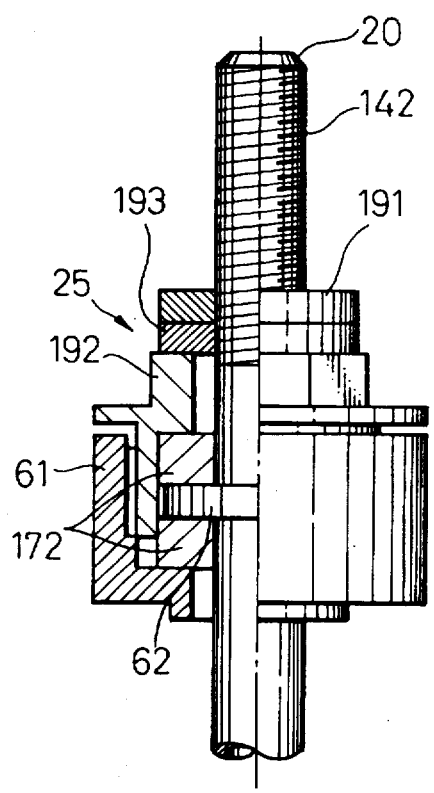
Figure 19B:
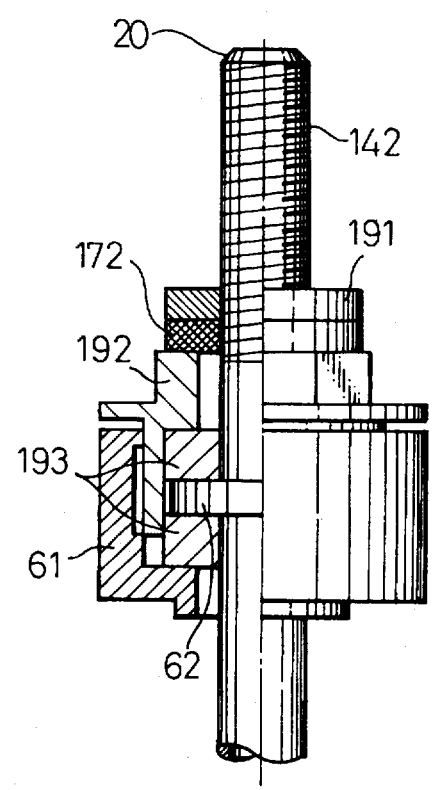

FIGS. 19A and 19B show another embodiment of the floating support construction for the penetrating portion 25 which utilizes a lock nut 191. In FIGS. 19A and 19B, a flange 62 and a thread 142 are provided on the outer surface of the electrode 20. The electrode 20 is supported by the holder 61 by screwing the lock nut 191 to the thread 142 and pressing the flange 62 to the holder via a member 192. In FIGS. 19A and 19B, numeral 172 shows insulating members similar to those in FIG. 17, and 193 shows disk-like porcelain insulators having center holes. In FIGS. 19A and 19B, the electrode 20 is electrically isolated from the holder 61 by the seal member 172 and porcelain insulator 193, and the electrode 20 is supported at two axially distant points by the lock nut 191 and the flange 62. Therefore, the rigidity of the support of the electrode 20 is increased while achieving the floating support of the electrode 20. Further, as shown in FIG. 19B, if the seal member 172 is placed between the lock nut 191 and the member 192, mud and water from the outside can be effectively prevented from entering into the holder 61.

In the embodiments explained above, several examples of the constructions of the penetrating portion 25 at which the electrode 20 penetrates the inlet casing 9 are explained. However, it should be noted that other constructions for the penetrating portion can be used for the present invention as explained later.

Next, the cross sectional shape of the hollow pipe electrode 20 is explained. As explained in FIG. 5, the temperature of the end portion 30 of the electrode 20 is lowered in the present invention by using a hollow pipe electrode 20 in order to improve the endurance of the electric supply cable 35 connected on the end portion 30. However, the temperature of the end portion 30 of the electrode 20 can be further lowered by using the electrode having an appropriate cross sectional shape.

Figure 20:
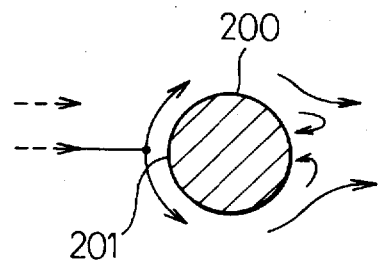
FIG. 20 show a cross section of the solid metal rod electrode and the exhaust gas flow around the electrode.

FIG. 20 shows a pattern of the exhaust gas flow when the portion of the electrode 20 that is substantially perpendicular to the exhaust gas flow consist of a conventional rod-like solid electrode 200 having a round cross section. When the cross sectional shape of the electrode 200 is round, the exhaust gas flow impinges on the front face 201 (the side of the electrode facing upstream of the exhaust gas flow) of the electrode 200, and the direction of the exhaust gas flow is abruptly changed. Therefore, the kinetic energy of the exhaust gas is converted into heat at the front face 201 of the electrode 200. This causes the temperature of the front face 201 to rise to nearly the total temperature of the exhaust gas flow (i.e., the temperature which is a sum of the actual temperature of the exhaust gas and the temperature rise caused by the conversion of the kinetic energy of the exhaust gas to heat). Therefore, the temperature of the electrode 200 sometimes becomes higher than the actual temperature of the exhaust gas.

Figure 21A:
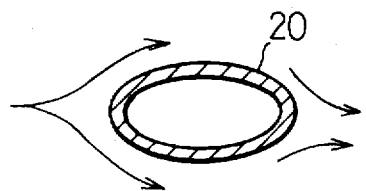
FIGS. 21A through 21D show the embodiments of the cross section of the electrode according to the present invention.
Figure 21C:
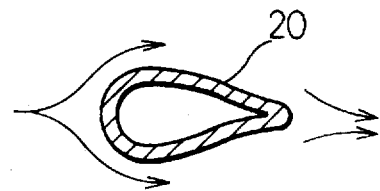
Figure 21B:
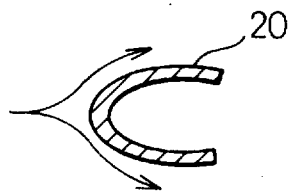
Figure 21D:
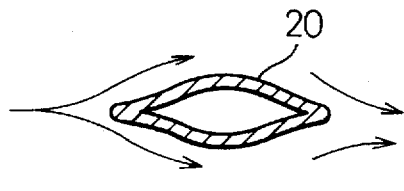

FIGS. 21A through 21D illustrate the embodiments of the cross sectional shape of the hollow pipe electrode 20 which can reduce the temperature rise caused by the conversion of the kinetic energy of the exhaust gas into heat. FIG. 21A shows an electrode 20 having a cross section of a hollow ellipse, FIG. 21B shows an electrode 20 having a cross section of the half cut hollow ellipse, FIG. 21C shows an electrode 20 having a cross section of hollow tear drop shape, and FIG. 21D shows an electrode 20 having a cross section of a flattened pipe. In FIGS. 21A through 21D, the exhaust gas flows smoothly along the surface of the electrode 20 instead of impinging on the front face thereof. Therefore, the temperature rise of the electrode caused by the conversion of the kinetic energy of the exhaust gas into heat can be reduced.

In the present invention, the heat mass and weight of the electrode 20 is reduced without lowering the structural rigidity by forming the electrode 20 as a hollow pipe. However, the heat mass and the weight of the electrode can be reduced to some extent by using an solid metal rod type electrode having an appropriate cross sectional shape. Though not constituting the present invention, such a solid metal rod type electrodes are illustrated in FIGS. 22A and 22B for reference.

Figure 22A:
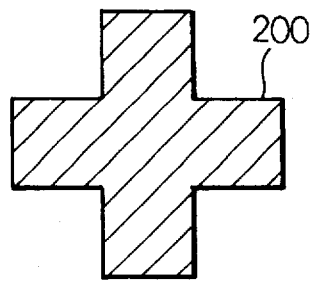
FIGS. 22A and 22B show other examples of the cross section of the electrode.
Figure 22B:
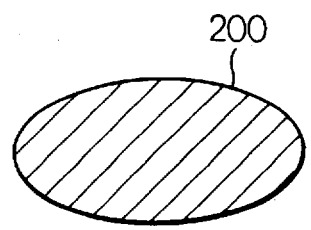

FIG. 22A shows a solid metal rod type electrode in which the cross sectional area (i.e., heat mass) is reduced without lowering the bending rigidity (section modulus) by forming the cross section of the electrode 200 in a cross-like shape. FIG. 22B shows a solid metal rod type electrode 200 in which the force exerted by the exhaust gas flow is reduced and the bending rigidity is increased at the same time by forming the cross section of the electrode 200 in an ellipse shape having a long axis disposed in parallel to the exhaust gas flow direction.

Next, the inlet casing 9 in the embodiment in FIG. 5 is explained. In FIG. 5, the inlet casing 9 consists of four part, i.e., an inlet portion 9a on which the inlet flange 7 is attached, a cylindrical portion which accommodates the heater-converter 10, a first cone-shaped portion 9b which connects the inlet portion 9a and the cylindrical portion 9c, and a second cone-shaped portion 9d which connects the inlet casing 9 to the cylindrical main casing 5 accommodating the main converter 15. Before, since the inlet casing had a complicated shape, the four portions 9a through 9d of the inlet casing 9 were separately manufactured and joined by welding to form a complete inlet casing 9. Therefore, a relatively large amount of the welding work was required to produce the inlet casing 9. This not only increased the amount of work required to manufacture the inlet casing 9 but also worsened the dimensional accuracy of the inlet casing 9 due to deflections after welding.

In the embodiment illustrated by FIG. 5, this problem is solved by producing the whole inlet casing 9 integrally from a straight pipe by a press working. In order to produce the inlet casing 9 in FIG. 5, a straight pipe of stainless steel having the same diameter as the cylindrical portion 9c is used. The portions of the straight pipe corresponding to the inlet portion 9a and the first cone-shaped portion 9b are formed by reducing the diameter of the straight pipe, and the portion corresponding to the second cone-shaped portion 9d is expanding the diameter of the straight pipe, respectively. Since the inlet casing 9 is formed integrally by a pressing work, no welding work is required except for the connection between the inlet flange 7 and the inlet portion 9a. Therefore, amount of the work for producing the inlet casing 9 is largely reduced. Further, the dimensional accuracy of the inlet casing, especially the accuracy of the cylindrical portion 9c in which the heater-converter 10 is to be accommodated, is largely improved.

Further, in the embodiment in FIG. 5, a ground terminal 54 is attached to the inlet flange 7 using one of the flange bolts 52. Before, the ground terminal was directly welded to the outer surface of the cylindrical portion 9c. However, if the ground terminal is welded to the cylindrical portion 9, the ground terminal is subject to damages during the transportation or assembly, since the ground terminal protrudes from the side of the cylindrical portion 9c. Further, sometimes deflection of the cylindrical portion 9c occur after welding the ground terminal thereon. In the embodiment in FIG. 5, since the ground terminal 54 is not welded to the inlet portion 9a, but attached to the ground cable 53. The ground terminal 54, together with the ground cable is connected to the inlet flange 7 by means of the flange bolt 52 which is used for connecting the flange 7 to the exhaust gas passage of the engine. Therefore, the ground terminal 54 can be easily attached to the inlet casing without requiring welding, and the amount of work required for attaching the ground terminal is largely reduced.

Figure 23A:
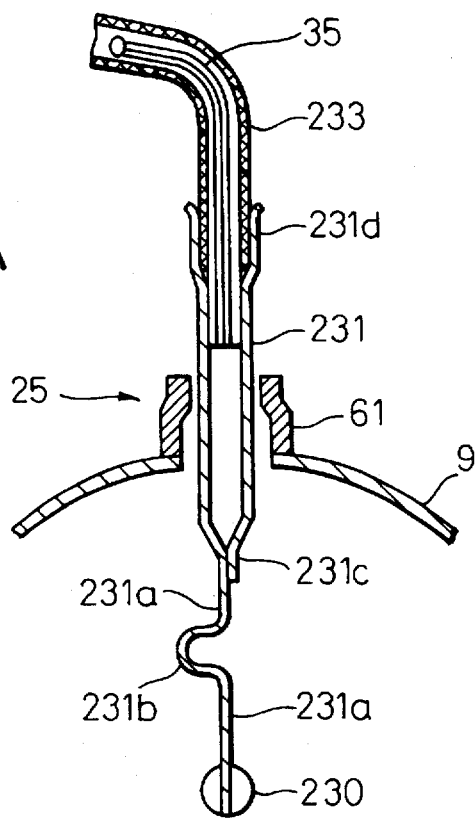
FIGS. 23A and 23B is a drawing illustrating an embodiment of the construction of the electrode according to the present invention.
Figure 23B:
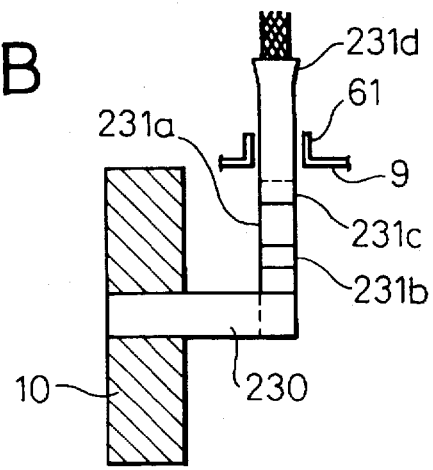

Next, an embodiment of the construction for the electrode is explained with reference to FIGS. 23A and 23B. FIG. 23A shows the electrode 231 of the present embodiment viewed from the downstream side of the exhaust gas flow, and FIG. 23B shows the same view from the direction perpendicular to the exhaust gas flow. In this embodiment, the center electrode 230 extending from the heater-converter 10 along the exhaust gas flow direction is made of a solid metal rod, and the electrode 231 which extends across the exhaust gas flow only is formed as a hollow pipe. Further, the pipe electrode 231 is split along the center axis thereof from the portion between the penetrating portion 25 to the end portion connected to the center electrode 230, and the split half of the pipe electrode 231 is cut off so that only the half split pipe 231a remains. In addition to that, this remaining half pipe 231a is flattened and curved portion 231b is formed on the flattened portion 231a. The end of the flattened portion 231a is welded to the end of the center electrode 230. As shown in FIGS. 23A and 23B, the faces of the flattened portion 231a are disposed along the direction of the exhaust gas flow so that the area thereof facing the exhaust gas flow is minimized.

Further, at the boundary between the flattened pipe portion 231a and the hollow pipe portion, the end portion 231c of the hollow pipe is squeezed in such a manner that the end of the hollow pipe portion is completely closed in order to prevent the exhaust gas from entering the inside of the hollow pipe. To ensure a positive gas seal at the end portion 231c, the end portion 231 may be seal welded after being squeezed.

At the other end 231d, the hollow pipe electrode is expanded, and an electric supply cable 35 having a protecting cover 233 is inserted into the expanded end 231d of the hollow pipe electrode 231. At the end of the cable 35, the protecting cover 233 is removed, and the exposed cable is fixed to internal surface of the hollow pipe electrode 231 by caulking or welding.

The cable 35 is made of heat resistant nickel wires and the protecting cover 233 is made of glass fibers. The protecting cover 233 is inserted into the expanded end portion 231d of the hollow pipe electrode 230 together with the cable 35 and held inside of the expanded end portion 231d by caulking the expanded end portion 231d. Therefore, the loosening of the end of the protecting cover is prevented.

FIG. 24 shows a connecting portion of the cable 35 in a conventional solid metal rod electrode 241. As shown in FIG. 24, when a conventional solid metal rod 241 is used, a cavity having a stepped diameter is drilled at the end of the electrode 241, and the cable 35 together with the protecting cover 233 is inserted into the larger diameter section 242 of the cavity to hold the end of the protecting cover 233. The exposed end of the cable 35 is further inserted into the smaller diameter section 243 of the cavity and welded to the electrode 241 through a hole 244 drilled on the side of the electrode to fix the exposed cable 35 to the electrode. As seen from FIG. 24, in the conventional solid metal rod electrode, the stepped diameter cavity and the hole 244 must be drilled at the end portion of the electrode. On the contrary, in the embodiment in FIGS. 23A and 23B, the stepped diameter cavity is not required to connect the cable 35 to the electrode, and the working process is largely simplified.

Further, in the embodiment in FIGS. 23A and 23B, a part of the hollow pipe electrode 231 is flattened and curved portion 231b is formed on the flattened portion 231a of the electrode 231 to increase the flexibility of the electrode. During the operation of the engine, the thermal expansion of the electrode 231 is absorbed by the elastic deformation of the curved portion 231b of the electrode, thus excessive stress is not exerted on the heater-converter 10 by the thermal expansion of the electrode 231.

FIGS. 25A and 25B show other examples of the construction for the curved portion 231b of the electrode 231. As shown in FIG. 25A, the curved portion may be doubled, or as shown in FIG. 25B, both of the split halves of the flattened portion may be used in order to form two curved portion in the opposite direction. Further, instead of forming a curved portion 231b, the flattened portion 231a may be twisted and bent at 90° before connecting the center electrode 230. By this arrangement, the thermal expansion of the center electrode 230, in addition to the thermal expansion of the hollow pipe electrode 231 can be absorbed by the flattened portion 231a. Though the curved portion 231b is formed in the direction perpendicular to the exhaust gas flow in FIGS. 23A and 23B, the direction of the curvature of the curved portion 231b may be changed in accordance with the manner of winding of the thin metal sheets in the heater-converter 10 in order to further reduce the thermal stress exerted on the heater-converter 10. Also, though the solid metal rod electrodes are used in the embodiments in FIGS. 23A, 23B and 26, the center electrode 230 may be formed as a hollow pipe electrode. In the embodiments in FIGS. 23A and 23B, the hollow pipe electrode 231 is fixed to the inlet casing 9 at the penetrating portion 25 having a construction same as, for example, in FIG. 12A.

Figure 27A:
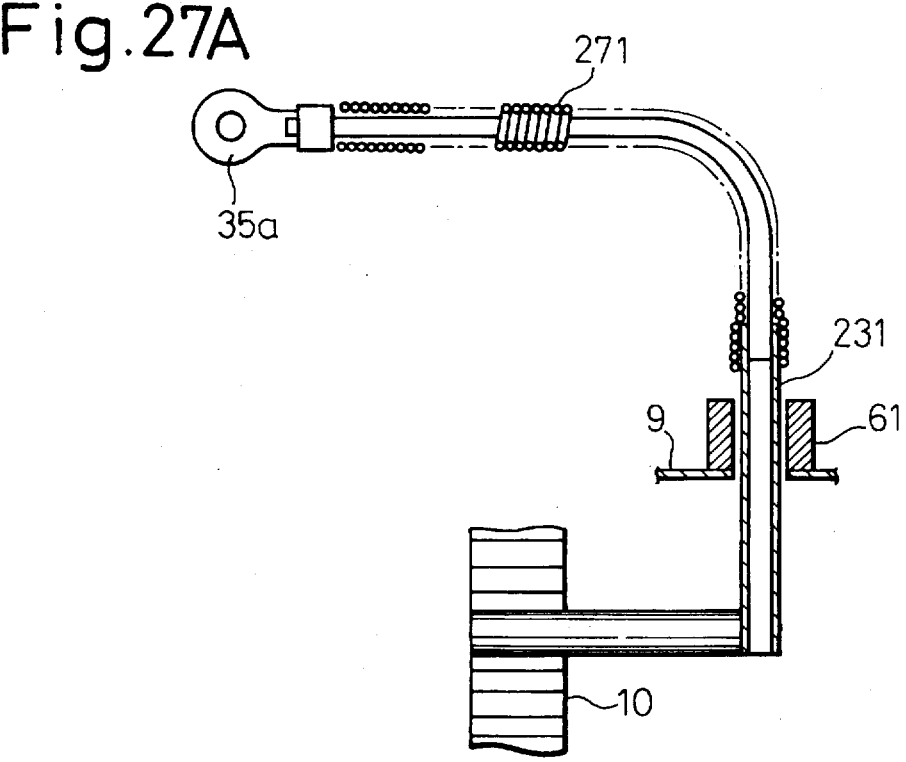
FIGS. 27A and 27B show an embodiment of the protection cover for the electric supply cable according to the present invention.
Figure 27B:
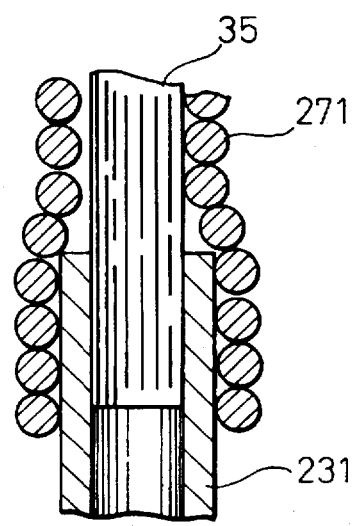

As explained in FIGS. 23A and 23B, usually, a cloth of woven glass fibers of ceramic fibers is used for the material of the protecting cover for the electric supply cable 35. However, such woven cloths are easily torn or loosened when contacting other members and this may cause a short circuit of the supply cable 35. FIGS. 27A and 27B illustrate an example of the protecting cover for electric supply cable 35 which has improved resistance against tears and loosening.

In FIG. 27A and 27B, a coil 271 formed from an insulating material is used as the protecting cover for the electric supply cable 35. The coil 271 covers the whole outer surface of the cable 35 between the electric supply terminal 35a and the connecting portion at the electrode 231. In this embodiment, the coil 271 is formed from a strands of a ceramic material such as alumina ($Al_2O_3$), however, the coil 271 may be made from a wire having an insulating coating. For example, the coil 271 may be formed from a wire of ferrous alloy containing aluminum component (such as 75% Fe-20% Cr-5% Al alloy) and the insulating coating of alumina ($Al_2O_3$) may be formed later by baking the coil 271 in an oxidation atmosphere.

In this embodiment, the inner diameter of the coil 271 is smaller than the outer diameter of the electrode 231 and, as shown in FIG. 27B, the end portion of the electrode 231 is pressed into the center of the coil 271 in such a manner that the coil 271 is fixed to the end of the electrode 231 by the elasticity of the coil 271. Thus, the loosening of the coil 271 is prevented and the insulation of the cable 35 is secured. Further, since the coil 271 is used for protecting the cable 35, sharp bend of the cable 35 near the end of the electrode, and damage of the cable 35 caused by such a sharp bend can be prevented.

Figure 28A:
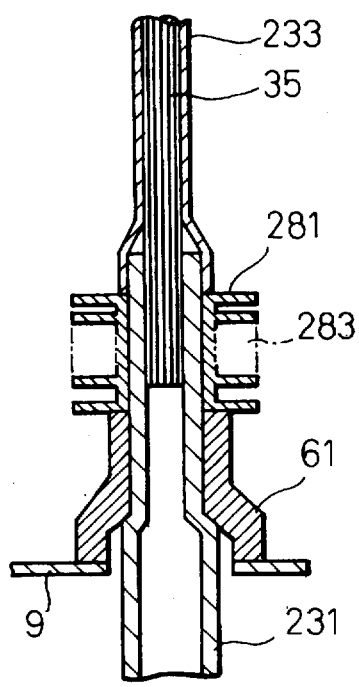
FIGS. 28A and 28B show embodiments of the construction for the connection between the cable and the electrode according to the present invention.
Figure 28B:
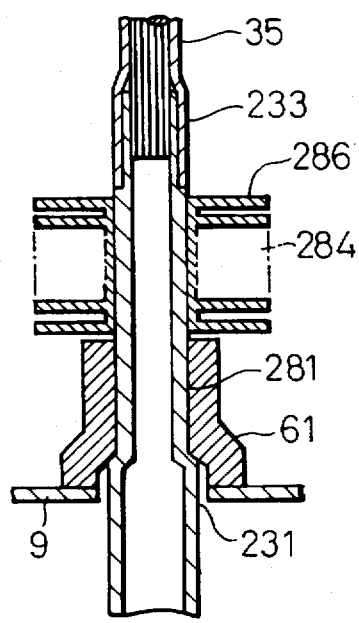

FIGS. 28A and 28B show examples of the construction for the connecting portion between the cable 35 and the electrode 231 which are capable of lowering the temperature of the cable 35 during the operation of the engine. As explained before, the temperature of the cable 35 at the end of the electrode 231 becomes high during the operation of the engine due to the heat transferred from the electrode 231. Therefore, expensive heat resistant nickel wires must be used for the cable 35. However, if the temperature of the connecting portion between the cable 35 and the electrode 231 can be lowered, less expensive copper wires, instead of the nickel wires, can be used for the cable 35.

In the embodiments in FIGS. 28A and 28B, cooling fins are provided on the outer surface of the connecting portion between the electrode 231 and the cable 35 in order to lower the temperature of the cable 35.

In the embodiment in FIG. 28A, an insulating coating 281 is applied on the outer surface of the electrode 231 by a thermal spray of ceramic, or formation of the alumina coating, and the electrode is fit into the holder 61 by, for example, press fitting, shrink fitting or soldering while preserving the insulating coating 281. The cooling fins 283 are provided on the outer surface of the upper portion of the holder 61, i.e., near the end of the electrode 231. According to this embodiment, since the electrode 231 is closely fit to the inner surface of the holder 61, the heat of the electrode 231 and the cable 35 at the connecting portion can be effectively dissipated to the ambient air through the cooling fins 283 on the holder 61. Therefore, the temperature of the cable 35 during the operation of the engine becomes lower.

FIG. 28B shows an embodiment which utilizes cooling fins 284 similar to the cooling fins 283 in FIG. 28A. However, in this embodiment, the cooling fin 284 is made separately from the holder 61. Further, no insulating coating is applied on the outer surface of the electrode 231, i.e., the cooling fin 284 contacts the outer surface of the electrode 231 directly. The insulating coating 286 in this embodiment is applied on the outer surface of the cooling fins 284. Therefore, the rate of the heat transfer between the electrode 231 and the cooling fin 284 is improved compared with the embodiment in FIG. 28A.

Next, another embodiment of the construction for the electrode is explained with reference to FIG. 29.

In this embodiment, the electrode is positively cooled by feeding cooling air to the inside of the hollow pipe electrode. In FIG. 29, an end of a hollow pipe electrode 291 is connected to the heater-converter 10, and the other end of the electrode 291 extending outside of the inlet casing 9 is inserted into a tube 293 made of woven fine wires. The woven wire tube 293 is electrically connected to the battery, and acts as a conductor for feeding electricity to the electrode 291. A fastening band 294 is provided to secure the woven wire tube 293 on the electrode 291. A tube 295 made of heat resistant resin is inserted into the woven wire tube 293 from the end thereof opposite to the electrode 291 and fixed to the woven wire tube 293 in such a manner that the ends of the electrode 291 and the heat resistant resin tube 295 face each other with a predetermined clearance therebetween. Further, air outlet holes 297 are provided on the wall of the pipe electrode 291 at the portion extending outside of the inlet casing 9. Also, similar air outlet holes 299 are provided on the wall of the heat resistant resin tube 295 at the portion located inside of the woven wire tube 293.

Figure 29:
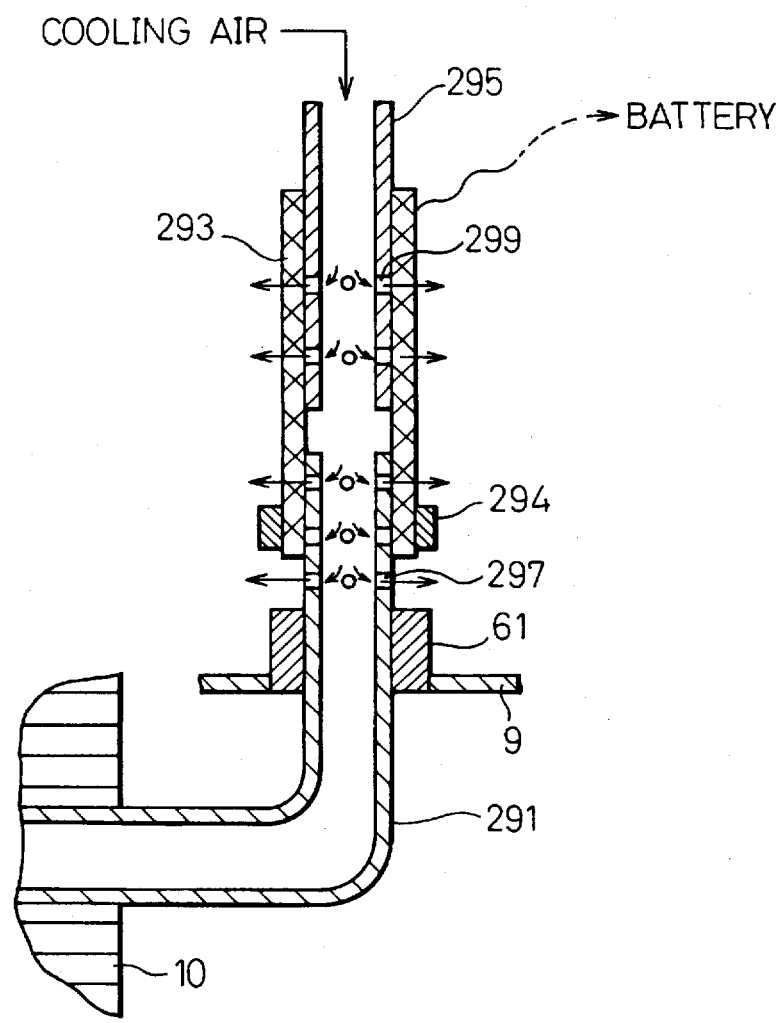
FIG. 29 shows an embodiment of the construction for the electrode according to the present invention.

In the embodiment in FIG. 29, the cooling air is fed to the inner space of the heat resistant resin tube 295 when the temperature of the electrode becomes more than a predetermined temperature (or, alternatively, when a predetermined time has lapsed after the engine starts). The cooling air fed to the inner space of the heat resistant resin tube 295 is discharged to the ambient air through the air outlet holes 297 and 299, and the hollow pipe electrode 291 as well as the woven wire tube 293 (i.e., conductor for feeding electricity to the electrode 291) is cooled by this cooling air flow.

According to the embodiment in FIG. 29, the temperature of the connecting portion between the electrode 291 and the electric supply conductor (i.e., the woven wire tube 293) is substantially lowered. Therefore inexpensive, (and having relatively poor heat resistance) copper wires can be used for the woven wire tube 293. As a supply source of the cooling air, a pressurized air supply unit including an air pump and a flow control valve can be used, however if the engine is provided with a turbocharger, a part of the outlet air of the turbocharger is preferably used as the cooling air source. Since the pressure of the outlet air of the turbocharger (i.e., boost pressure) changes in accordance with the engine load (i.e., the exhaust gas temperature), the cooling air flow supplied to the electrode 291 also changes according to the amount of the heat received by the electrode 291 (i.e., the exhaust gas temperature). Therefore, the cooling air flow is automatically controlled in accordance with the amount of the heat received by the electrode 291 by using the outlet air of the turbocharger as the cooling air source, without using a complicated cooling air flow control system.

Next, another embodiment of the construction for the electrode is explained with reference to FIG. 30.

In this embodiment, the pipe electrode is divided into two pieces at the portion between the penetrating portion of the casing and the end connected to the center electrode of the heater-converter, i.e., the pipe electrode consists of two discontinuous pipe portions and these two discontinuous pipe portions are connected each other by a flexible conductive member inserted into and fixed to both the pipe portions.

As explained in FIG. 17, it is preferable to constitute the penetrating portion 25 of the casing as the floating support in order to prevent the thermal expansion of the electrode from causing excessive stress in the heater-converter. However, when rigidity of the support of the electrode is required, it is preferred to fix the electrode to the casing rigidly. The embodiment in FIG. 30 illustrates the construction of an electrode which is not subjected to excessive stress exerted on the heater-converter while allowing rigid support of the electrode.

Figure 30:
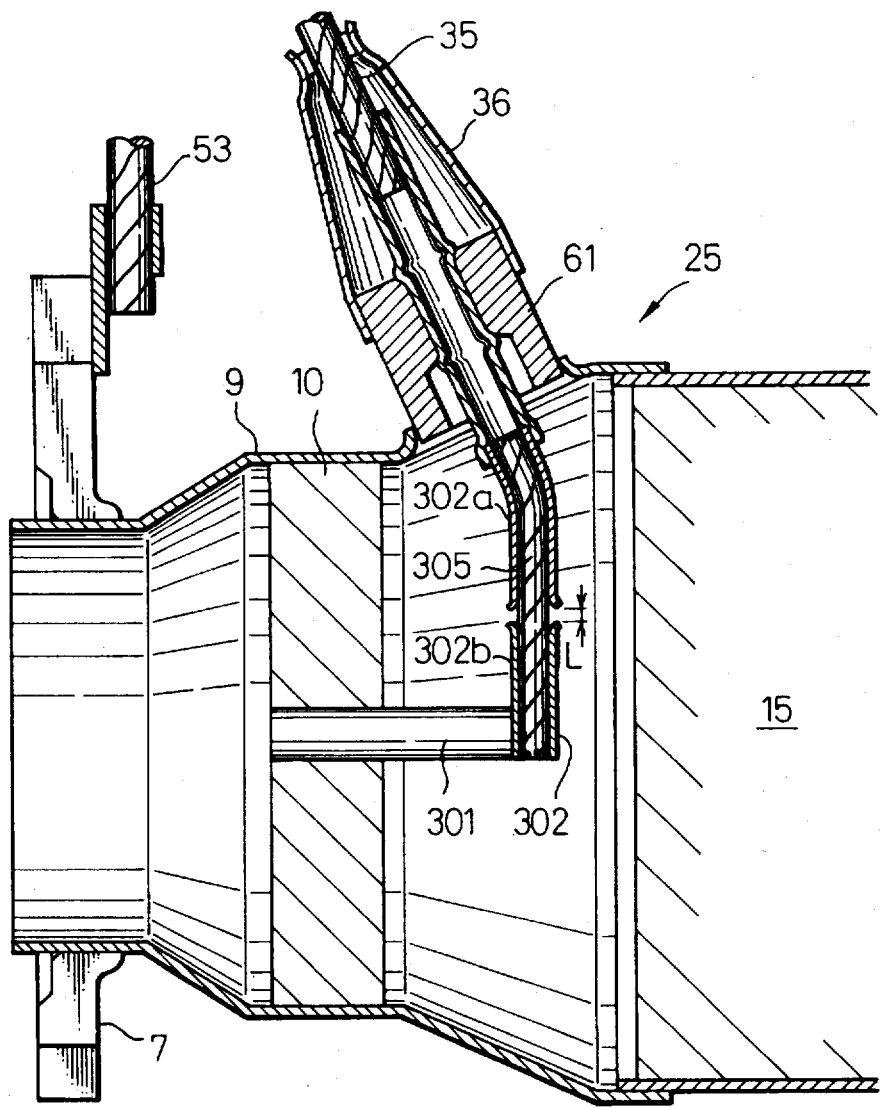
FIGS. 30 through 34 show embodiments of the construction for the electrode according to the present invention.
Figure 31:
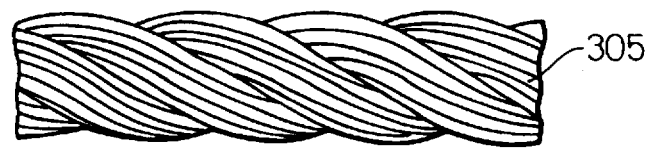

In FIG. 30, numeral 301 shows a center electrode of the heater-converter 10, and numeral 302 shows a hollow pipe electrode which is welded to the end of the center electrode 301. As shown in FIG. 30, the pipe electrode 302 of the present embodiment consists of two pipe portions 302a and 302b. The pipe portions 302a and 302b are connected by a flexible conductive member, i.e., by a conductive cable 305, for example, inserted into both the pipe portions 302a and 302b in such a manner that the ends of the portions 302a and 302b face each other at a predetermined interval L. The interval L is set as small as possible in the range that can prevent the ends of the pipe portions 302a and 302b from coming into contact by thermal expansion, in order to minimize the length of the cable exposed to the exhaust gas flow. As shown in FIG. 31, the cable 305 is made of twisted strands of fine nickel wires, and the cable 305 is inserted into the hollow spaces of the pipe portions 302a and 302b, at both ends thereof and welded to the inner surface of the pipe portions 302a and 302b. Thus, the pipe portions 302a and 302b are connected to each other by the cable 305. At the penetrating portion 25 of the inlet casing 9, the pipe portion 302a of the hollow pipe electrode 302 is secured to the holder 61 in the same manner as explained in FIG. 12A. In this embodiment, electricity is fed to the center electrode 301 through the pipe portion 302a, the cable 305 and the pipe portion 302b.

As understood from FIG. 30, thermal expansion of the center electrode 301 is absorbed by the deflection of the cable 305. Therefore, the thermal expansion of the center electrode 301 does not exert any axial force on the heater-converter 10. Further, though the pipe portions 302a, 302b and the cable 305 expand in the radial direction during the operation of the engine, the expansion in the radial direction is absorbed by the contraction of the cable 305. Namely, when a force in the direction along the axis of the cable 305 is exerted, the twisted strands of wires constituting the cable 305 loosen by a small amount and the cable 305 contracts as a whole. Therefore, thermal expansion of the pipe portions 302a, 302b and cable 305 do not exert any radial force on the heater-converter 10. Therefore, it is important to use a cable made of twisted strands of fine wires for connecting the pipe portions 302a and 302b. If a bundle of fine straight wires instead of the cable 305 is used for connecting the pipe portions 302a and 302b, the respective wires must bend in order to absorb the thermal expansion in the radial direction, and the durability of the wires is lowered by bending. In this embodiment, since the cable 305 is made of twisted strands of wires, the durability of the cable 305 is improved.

Further, in this embodiment, a large portion of the cable 305 is covered by the pipe portions 302a and 302b and is not exposed to the exhaust gas flow. Therefore, deterioration of the cable 305 due to corrosive components in the exhaust gas, or flutter of the cable 305 due to exhaust gas flow can be prevented.

As explained above, according to the present embodiment, excessive stress on the heater-converter 10 is not exerted by the thermal expansions of the electrodes 301 and 302, by constituting the hollow pipe electrode of the discontinuous pipe portions 302a and 302b connected by the cable 305 of twisted strands of fine wires.

Figure 32:
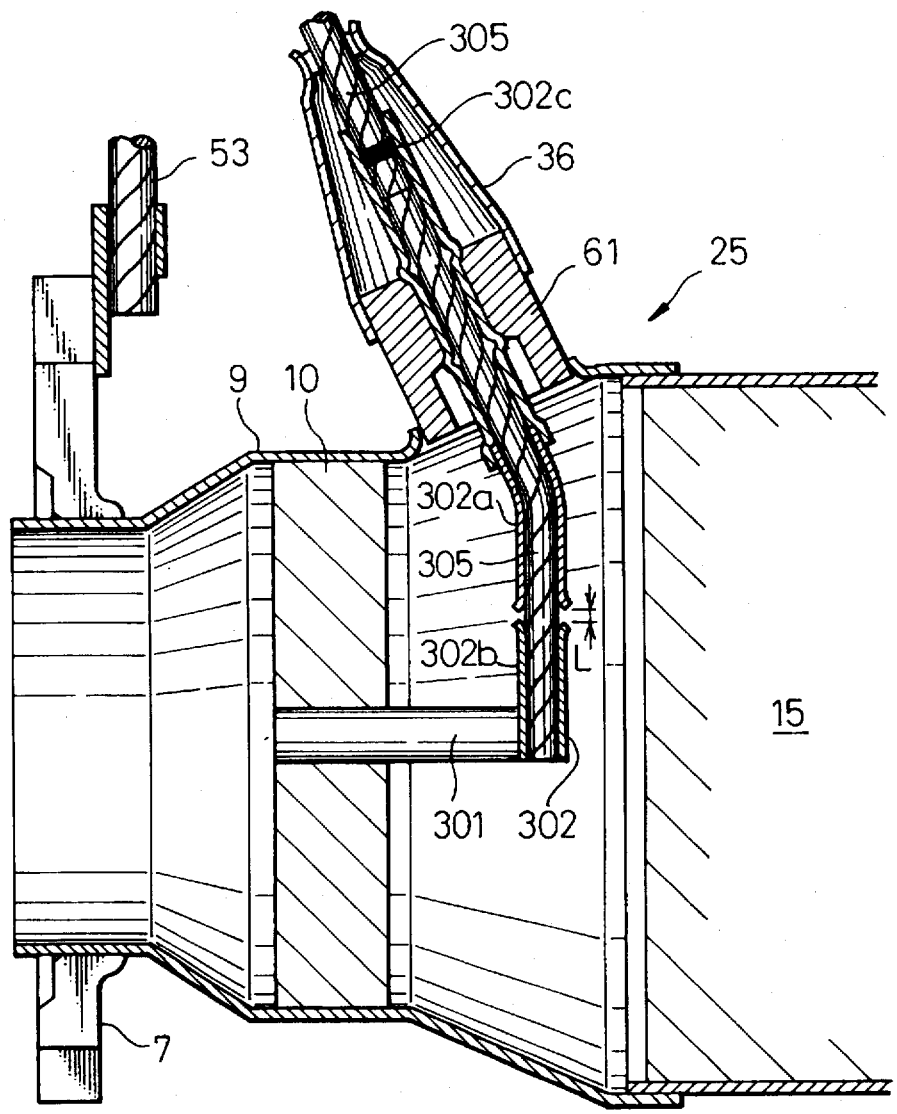

FIG. 32 shows another embodiment of the construction for the electrode with reference to FIG. 32. In this embodiment, the pipe electrode 302 has a similar construction to those in FIG. 30. However, though the cable 305 in FIG. 30 is only long enough to connect the pipe portions 302a and 302b, the cable 305 of twisted strands of fine wires in this embodiment extends through the whole length of the pipe electrode 302 and further extends from the end of the electrode 302 to outside of the inlet casing 9. Namely, in this embodiment, the cable 305 connecting the pipe portions 302a and 302b also acts as an electric supply cable 35 in FIG. 30. To prevent the exhaust gas in the casing 9 from leaking through the clearance between the cable 305 and the inner walls of the pipe portion 302a, the outer surface of the cable 305 and the inner surface of the pipe portion 302a are attached to each other by caulking or welding at the outer end 302c of the pipe portion 302a. Namely, the pipe portion 302b of the present embodiment is supported by the outer end 302c of the pipe portion 302a via the cable 305.

In the embodiment in FIG. 30, electric current flows through the wall of the pipe portion 302a between the cable 35 and the cable 305. Therefore, the wall of the pipe portion must be thick enough to ensure low electrical resistance. However, in this embodiment, since the cable 305 also acts as an electric path to supply electricity to the center electrode 301, the wall thickness, or the diameter of the pipe portion 302a can be reduced. Further, the cable 305 extends to the end of the pipe portion 302b where the center electrode 301 is connected to the pipe portion 302b. Therefore, only one connection is required to supply electricity to the center electrode 301 instead of three connections (i.e., between cable 35 and the pipe portion 302a, between cable 35 and pipe portions 302a, 302b) in the embodiment in FIG. 30. This improve the reliability of the electrical path. Further, in this embodiment, the cable 305 is fixed to the opposite ends of the pipe portions 302a and 302b. Therefore, the distance between the fixed points of the cable 305 becomes larger than that of the embodiment in FIG. 30. Thus, the durability of the cable 305 is increased in this embodiment since the amount of the deflection per unit length of the cable 305 required for absorbing the thermal expansion of the electrodes 301 and 302 becomes smaller.

Figure 33:
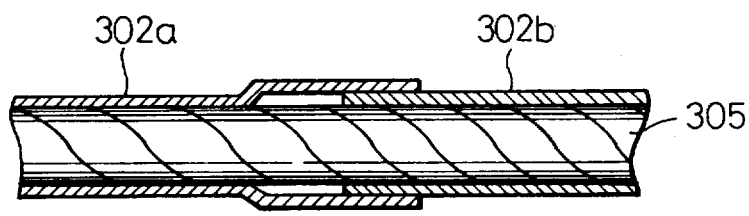

FIG. 33 shows another embodiment of the connection between the discontinuous pipe portions 302a and 302b. Though in the embodiments in FIGS. 30, and 32, the pipe portions 302a and 302b are separated completely by the interval L so that the pipe portions 302a and 302b do not contact when expanding, the first pipe portion (in FIG. 33, pipe portion 302a) is expanded along an appropriate length in this embodiment and the second pipe portion (in FIG. 33, pipe portion 302b) is inserted into the expanded end of the first pipe portion. The inner diameter of the expanded first portion is set larger than the outer diameter of the second pipe portion in such a manner that the inserted pipe portion can slide in telescopic manner. Therefore, the thermal expansion of the pipe portions 302a and 302b is absorbed by the telescopic motion of the inserted pipe. Further, the thermal expansion of the center electrode 301 can be absorbed by a radial clearance between the pipe portions at the telescopic connection. In this embodiment, since the cable 305 of the twisted strands of fine wires is completely covered by the pipe portions and isolated from the exhaust gas completely, the durability of the cable 35 further increases.

Figure 34:
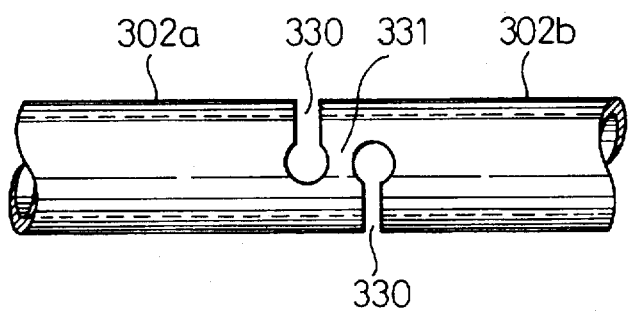

FIG. 34 shows another embodiment of the connection of the discontinuous pipe portions 302a and 302b. In this embodiment, the pipe portions 302a and 302b are not separated completely, but only discontinuous portions are formed between the pipe portions 302a and 302b by slits 330 as shown in FIG. 34. Namely, the pipe portions 302a and 302b are connected to each other by the portion 331 between the slits 330. In this case, the portion between the slits 330 acts as a weak spring, and deflects when force is exerted along the pipe. Therefore, the thermal expansions of the pipe portions 302a and 302b can be absorbed by this portion.

Next, other embodiments of the construction for the penetrating portion 25 of the casing which has enhanced insulation capability as well as good gas seal capability are explained.

Figure 35:
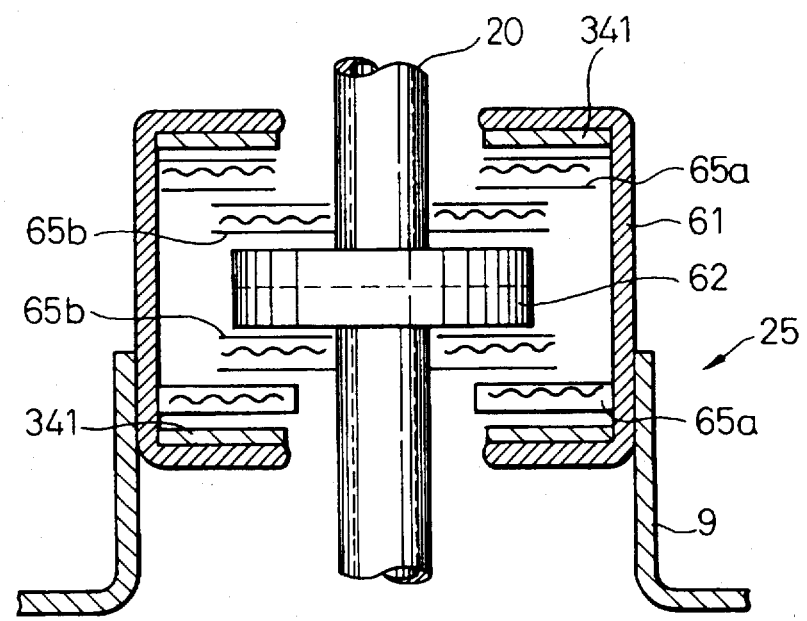
FIGS. 35 and 36 show other embodiments of the penetrating portion of the casing according to the present invention.

FIG. 35 shows an example of such a construction for the penetrating portion 25. In FIG. 35, the holder 61 formed in the manner explained in FIG. 6 is welded to the inlet casing 9, and a flange 62 similar to that of FIG. 6 is formed on the outer surface of the hollow pipe electrode 20. In FIG. 35, numerals 65a and 65b show insulating members each consisting of thin metal plates having insulating coatings on the surfaces. The thin metal plates constituting the insulating members 65a and 65b are, for example, made of ferrous alloy which is used for the thin metal plates composing the laminated assembly of the heater-converter 10 (such as 75% Fe-20% Cr-5% Al alloy), and baked in the oxidation atmosphere to form the insulating coating of alumina ($Al_2O_3$) of about 1 micron in thickness.

The insulating members 65a and 65b are formed on disk-like shape having a center holes. The diameter of the center hole of the insulating member 65a is larger than the outer diameter of the hollow pipe electrode 20, and the outer diameter of the insulating member 65a is nearly the same as the inner diameter of the holder 61. On the other hand, the diameter of the center hole of the insulating member 65b is nearly the same as the outer diameter of the hollow pipe electrode 20, and the outer diameter of the insulating member 65b is smaller than the inner diameter of the holder 61. In FIG. 35 the thin metal plates are laminated on both sides of the flange 62 to form the insulating members 65a and 65b. The insulating members 65a and 65b, which are composed of the laminated thin metal plates, are held in place by bending the upper face of the holder 61. In this embodiment, contact members 341 are inserted between the upper face and bottom face of the holder 61 and the insulating members to improve the seal capability.

When the insulating coatings are formed on the surface of the thin metal plate composing the insulating members 65a and 65b, insulating coatings applied on the edge of the thin metal plates (such as the edge of the center hole, or outer periphery of the disk) are not stable and sometimes peel off easily. Therefore, if the edges of the thin metal plates of the insulating members contact the outer surface of the electrode 20 and the inner surface of the holder 61, it is difficult to maintain insulation between the electrode 20 and the holder 61.

In this embodiment, the edges of the center holes of the thin metal plate disk of the insulating members 65a do not contact the outer surface of the electrode 20, and the outer peripheries of the thin metal plate disk of the insulating members 65b do not contact the inner surface of the holder 61. Further, the thin metal plates of the respective insulating members are isolated from each other by the insulating coatings. Therefore, the electrode 20 and the holder 61 can be isolated from each other even though the insulating coatings on the edges of the thin metal plate disks are peeled off. Further, since the insulating members in these embodiments are composed of laminated thin metal plates, contact pressure between the insulating members and other members can be obtained without damaging the insulating members. Therefore, an effective gas seal capability is obtained by the contacts between the surfaces of the thin metal plates and the flange 62 of the electrode 20 and the contacts members 341.

The insulating members 65a and 65b may be formed by the plain thin metal sheets only, however, when the plain metal sheets and the laminated metal sheets are used for the insulating members 65a and 65b as shown in FIG. 35, the insulating members also can be used as cushion members to obtain the floating support of the electrode 20. The insulating members 65a and 65b may be laminated by placing one upon another, or the insulating members 65a and 65b may be separately laminated. However, to ensure the isolation between the electrode 20 and the holder 61, both of the insulating members 65a and 65b must be disposed on each side of the flange 62.

Figure 36:
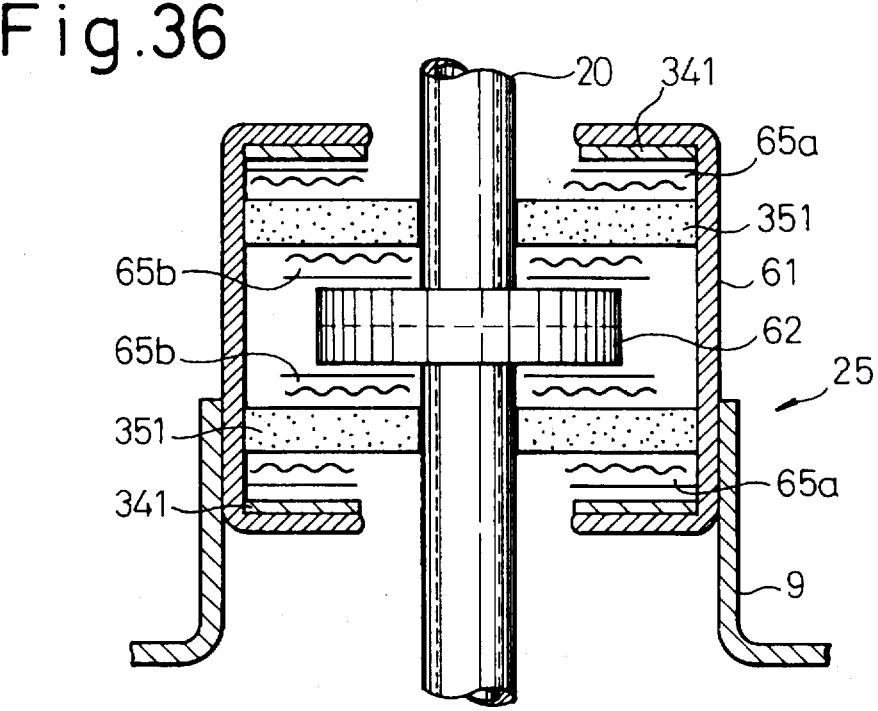

FIG. 36 shows the construction for the penetrating portion 25 in which the gas seal capability is further improved. In FIG. 36, seal members 351 made from material which has a relatively large coefficient of thermal expansion are used in addition to the insulating members 65a and 65b. In this embodiment, the seal members 351 expand when the penetrating portion 25 becomes hot during the operation of the engine, and close the clearances between the members. Therefore, higher gas seal capability is obtained. As the material used for the seal members 351, mica base sealant is used. Such a sealant is commercially available.

Next, an embodiment of the construction for the center electrode of the heater-converter 10 is explained with reference to FIGS. 37 and 38.

In the embodiments explained above, the heat mass of the electrode is reduced by using the hollow pipe electrode in order to reduce the time required to heat up the catalytic converter. In this embodiment, the time required for heating up the catalytic converter can be further reduced as explained below.

Figure 37:
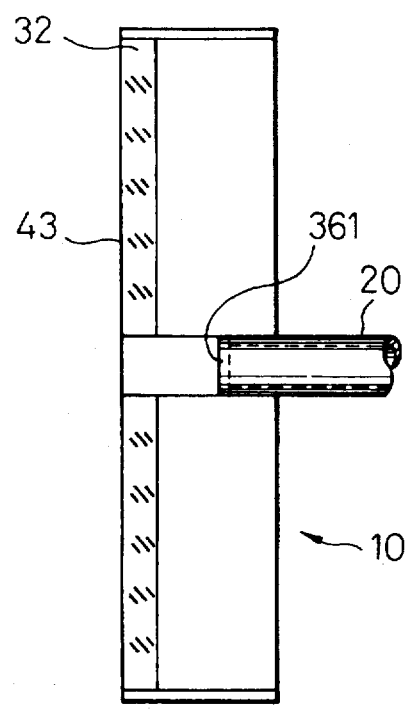
FIGS. 37 and 38 are drawings illustrating an embodiment of the construction for the electrode according to the present invention.

FIG. 37 shows a view of the section of the laminated assembly of the heater-converter 10 taken along the center axis, which is similar to FIG. 4. However, the hollow pipe electrode 20 in FIG. 37 is shorter than the electrode 20 in FIG. 4, i.e., in FIG. 37, the end 361 of the hollow pipe electrode 20 is terminated in the laminated assembly and does not extend to the upstream side face of the laminated assembly. As explained in FIG. 4, the heat spots (the conductive connections) 43 are disposed on the upstream end of the laminated assembly. Therefore, it is preferable to reduce the heat mass of the heater-converter 10 at the portion near the heat spots 43 in order to accelerate the temperature rise of the heat spots. In this embodiment, since the heat mass of the electrode 20 does not exist near the heat spot, the heat mass around the heat spots is largely reduced. Therefore, the temperature of the upstream side face of the heater-converter 10 rises rapidly after the electricity is fed, and the catalyst is activated shortly after the engine starts.

Further, in this embodiment, since the weight of the electrode 20 is smaller than that of a conventional electrode such as in FIG. 2, the weight of the heater-converter 10 can be reduced as a whole In FIG. 37, the end 361 of the hollow pipe electrode 20 is closed to prevent the exhaust gas from entering inside the electrode 20. However, the hollow space in the electrode 20 may be blocked at another portion of the electrode.

Figure 38:
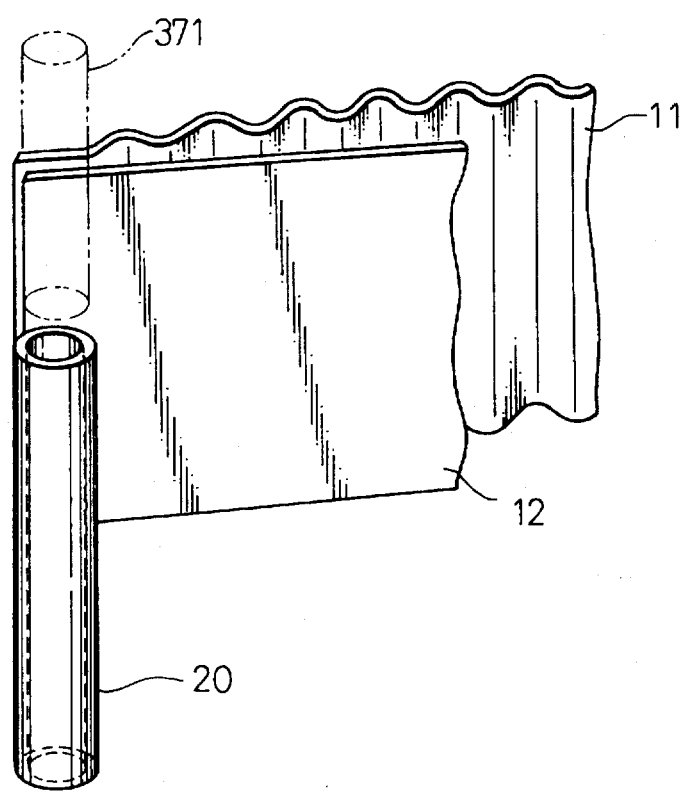

FIG. 38 shows the method for producing the heater-converter 10 in the embodiment in FIG. 37. As shown in FIG. 38, when forming the cylindrical laminated assembly of the thin metal sheets, a mandrel 371 is abutted to the end of the electrode 20, and the thin metal sheets 11 and 12 are wound around the center electrode 20 and the mandrel 371. After forming the cylindrical laminated assembly, the conductive connections 43 are formed on the end face of the laminated assembly. Then, the mandrel 371 is pulled out from the laminated assembly.

In the embodiment in FIG. 37, the heat spots (conductive connections) 43 are formed on the upstream side face of the laminated assembly. However, even though the heat spots are formed inside of the laminated assembly, the time required for heating up the heater-converter can be reduced by reducing the length of the portion of the center electrode located inside of the heater-converter.

Next, another embodiment of the construction for the electrode of the heater-converter is explained with reference to FIG. 39. In the embodiment previously explained in FIG. 30, the discontinuous portions are formed on the electrode in order to avoid excessive stress on the heater-converter, by absorbing the thermal expansion of the electrode. In the present embodiment, excessive stress on the heater-converter can be avoided with a simple construction for the electrode without using the discontinuous portions.

Figure 39:
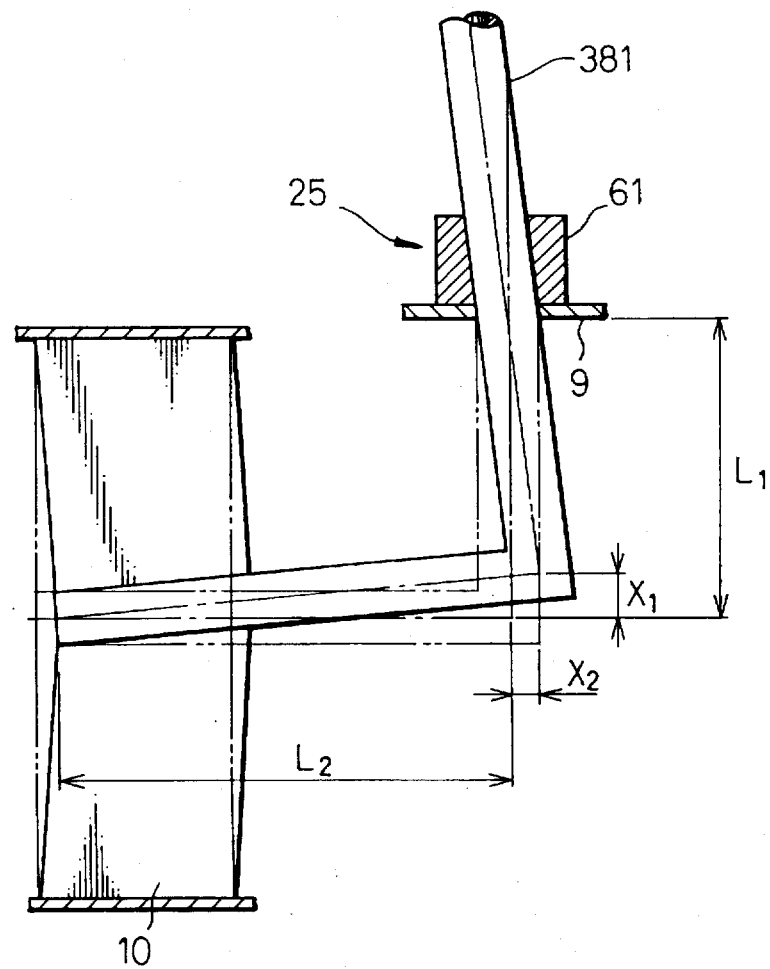
FIGS. 39 and 40 show embodiments of other constructions for the electrode according to the present invention.

FIG. 39 schematically illustrates the position of the hollow pipe electrode in a cold condition according to the present embodiment. As shown in FIG. 39, the hollow pipe electrode 381 of the present embodiment is fixed to the inlet casing 9 at the cold condition with an offset by an amount equal to the amount of the thermal expansion of the electrode. Namely, the length of the radial portion (the portion that extends perpendicular to the exhaust gas flow) of the electrode 381 and the length of the axial portion (the portion that extends along the direction of the exhaust gas flow) of the electrode 381 are set shorter than the length determined by the relative positions of the penetrating portion 25 of the casing 9 and the heater-converter 10 ($L_1$, $L_2$ in FIG. 39, respectively) by the amount $X_1$ and $X_2$, respectively, as shown in FIG. 39. The amounts $X_1$ and $X_2$ are equal to the amount of the thermal expansions of the respective portions of the electrode during the operation of the engine in order that the electrode 381 moves to the position indicated by the dotted line in FIG. 39 during the operation of the engine. Therefore, in the cold condition, tensile stress is exerted on the radial portion and the axial portion of the electrode 381 by this offset.

At the penetrating portion 25 of the casing 9, the electrode 381 is firmly secured to the casing 9 by the method, for example, shown in FIG. 12A.

When the temperature of the electrode becomes high during the operation of the engine, the radial portions and the axial portions expand by the amount $X_1$ and $X_2$, respectively, since the lengths of the radial portion and the axial portion of the electrode become $L_1$ and $L_2$ by thermal expansion. Therefore, during the operation of the engine, practically no stresses are exerted on the radial portion and the axial portion of the electrode 381. Consequently, no excessive stress is exerted on the heater-converter 10 by the thermal expansion of the electrode 381. When the engine is operated at full load, the exhaust temperature becomes very high (for example, about 900° C.), and the amount of the thermal expansion of the electrode also becomes large. Therefore, if the electrode is firmly fixed to the inlet casing, the stress exerted on the heater-converter by the thermal expansion of the electrode becomes very large in the conventional construction for the electrode. However, in this embodiment, by fixing the electrode 381 with offset at the cold condition, the stress exerted on the heater-converter 10 becomes practically negligible during the normal load operation of the engine and, also becomes small during the full load operation of the engine. Therefore, the durability of the heater-converter is largely improved. Further, according to the present invention, relatively large stress is exerted on the heater-converter 10 during the cold condition due to the offset of the electrode 381. However, when the temperature is low, the tensile strengths of the materials of the laminated assembly and the electrode become larger compared with those when the temperature is high. Therefore, the durability of the heater-converter is not affected by the offset of the electrode 381.

Figure 40:
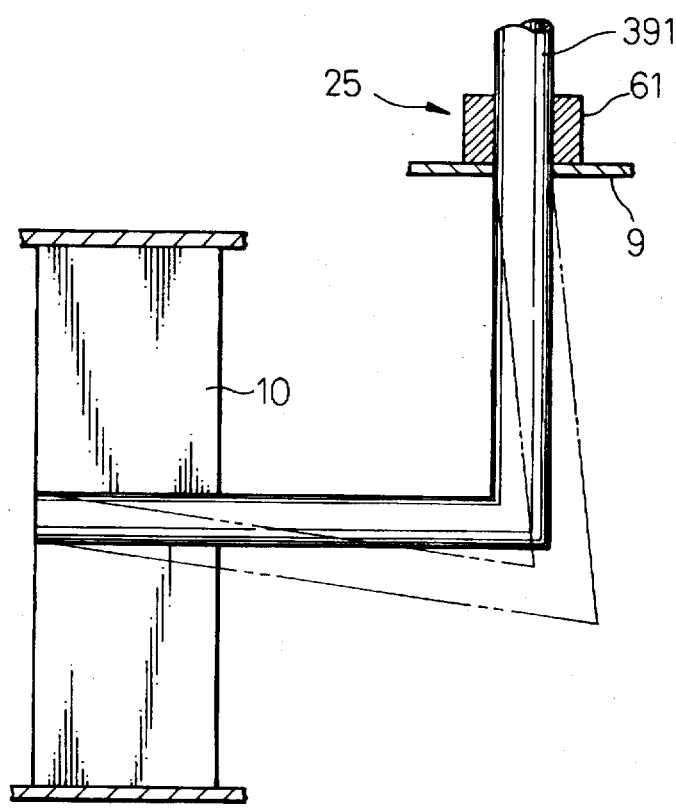

FIG. 40 schematically illustrates another embodiment of the construction for the electrode of the heater-converter which is similar to the embodiment of FIG. 40.

In this embodiment, the center portion of the heater-converter 10 around the electrode 391 is formed in such manner that the displacement of the electrode 391 can be absorbed by the displacements and the deflections of the thin metal sheets constituting the heater-converter 10, and the electrode 391 is firmly secured to the inlet casing 9 without any offset. The electrode 391 of the present invention is displaced by the thermal expansion as indicated by the dotted line in FIG. 40 during the operation of the engine.

However, in this embodiment, when the thin metal sheets are wound around the electrode 391 to form the cylindrical laminated assembly, several layers of the thin metal sheets around the electrode are wound loosely in such a manner that the thin metal sheets can be displaced or deflected when the electrode is displaced as shown in FIG. 40. By this loose winding of the thin metal sheets, the thermal expansion of the electrode is absorbed by the displacements and the deflections of the layers of the thin metal sheets, and does not exert excessive stress on the heater-converter 10. According to the present embodiment, excessive stress on the heater-converter can be avoided without offsetting the electrode.

We claim:

1. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in said casing for heating said substrate;

a rod electrode having a first end and a second end, said first end of the rod electrode being connected to said electric heater, said rod electrode extending from said electric heater and penetrating a wall of said casing disposed adjacent to said second end of said rod electrode, wherein, at least a portion of said rod electrode including said second end is formed as a hollow pipe having a hollow space therein and wherein an intermediate part of the hollow pipe portion extending within said casing is squeezed so that opposite sides of the hollow pipe portion are brought into contact with one another to seal the hollow space inside the intermediate part and wherein the squeezed part of the hollow pipe portion is separated from the first and second ends of the rod electrode; and an electric supply cable inserted and fit into said hollow pipe portion of the rod electrode at said second end thereof.

2. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in said casing for heating said substrate;

a rod electrode having a first end and a second end, said first end of the rod electrode being connected to said electric heater, said rod electrode extending from said electric heater and penetrating a wall of said casing disposed adjacent to said second end of the rod electrode, wherein, at least a portion of said rod electrode is formed as a hollow pipe having a hollow space therein and wherein an intermediate part of the hollow pipe portion extending within said casing is squeezed so that opposite sides of the hollow pipe portion are brought into contact with one another to seal the hollow space inside the intermediate part;

means for supplying a cooling air to the hollow space of said hollow pipe portion of said rod electrode;

an electric supply cable inserted and fit into said hollow pipe portion of the rod electrode at said second end thereof.

3. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in the casing for heating the substrate, wherein said electric heater comprises a cylindrical assembly including a plurality of laminated thin metal sheets spirally wound around a center electrode;

a rod electrode having a hollow pipe portion connected to said a center electrode; and wherein said hollow pipe portion of the rod electrode comprises two discontinuous hollow pipe portions, each of said two discontinuous hollow pipe portions having a hollow space therein, and wherein said two discontinuous hollow pipe portions are connected to each other by a flexible conductive member inserted and fit into the hollow spaces of said respective discontinuous hollow pipe portions.

4. An electrically heated catalytic converter according to claim 3, wherein an end of one of said discontinuous pipe portions is inserted into the hollow space of an end of the other of said discontinuous pipe portions in such a manner that the discontinuous pipe portions form a telescopic connection therebetween.

5. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in the casing for heating the substrate;

a rod electrode having a first end and a second end, said first end of the rod electrode being connected to said electric heater, said rod electrode extending from said electric heater and penetrating a wall of said casing disposed adjacent to said second end of the rod electrode, wherein, at least a portion of said rod electrode is formed as a hollow pipe having a hollow space therein and wherein an intermediate part of the hollow pipe portion extending within said casing is squeezed to seal the hollow space inside the intermediate part, wherein a flange is formed on an outer surface of said rod electrode at said second end;

a cushion member inserted between said flange and a wall surface of said casing;

a holder fixed to said casing and accommodating said flange and said cushion member, wherein said cushion member is formed by laminating a first thin metal plate having insulating coating on at least one surface thereof to a second thin metal plate having insulating coating on at least one surface thereof, and said first thin metal plate is disposed in such a manner that a gap is maintained between edges of said first thin metal plate and said outer surface of said rod electrode and said second thin metal plate is disposed in such manner that gaps are maintained between edges of said second metal plate and an inner surface of said holder; and an electric supply cable inserted and fit into said hollow pipe portion of the rod electrode at said second end thereof.

6. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in the casing for heating the substrate;

a rod electrode having a first end and a second end, said first end of the rod electrode being connected to said electric heater, said rod electrode extending from said electric heater and penetrating a wall of said casing disposed adjacent to said second end of the rod electrode, wherein, at least a portion of said rod electrode is formed as a hollow pipe having a hollow space therein and wherein an intermediate part of the hollow pipe portion extending within said casing is squeezed to seal the hollow space inside the intermediate part, wherein said rod electrode includes a center electrode connected to the hollow pipe portion, wherein said electric heater comprises a cylindrical assembly including a plurality of thin metal sheets spirally wound and laminated around the center electrode which extends along a direction of an exhaust gas flow, and said hollow pipe portion is connected to said center electrode at a portion of the center electrode downstream of said laminated assembly along exhaust gas flow, and an upstream side end of said center electrode is located downstream of an upstream end surface of said laminated assembly; and an electric supply cable inserted and fit into said hollow pipe portion of the rod electrode at said second end thereof.

7. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in the casing for heating the substrate;

a rod electrode having a first end and a second end, said first end of the rod electrode being connected to said electric heater, said rod electrode extending from said electric heater and penetrating a wall of said casing disposed adjacent to said second end of the rod electrode, wherein, at least a portion of said rod electrode is formed as a hollow pipe having a hollow space therein and wherein an intermediate part of the hollow pipe portion extending within said casing is squeezed to seal the hollow space inside the intermediate part, wherein said rod electrode includes a center electrode connected to said hollow pipe portion and the electric heater comprises a cylindrical assembly including a plurality of thin metal sheets spirally wound and laminated around the center electrode which extends along a direction of an exhaust gas flow, and wherein said rod electrode is coupled to the cylindrical casing and to the cylindrical assembly so that, at start-up of the engine, when the rod electrode is cold, the rod electrode is subjected to tensile stress and wherein, as the temperature of the rod electrode is elevated due to an increase in the temperature of the exhaust gas, the tensile stress to which the rod electrode is subjected decreases; and an electric supply cable inserted and fit into said hollow pipe portion of the rod electrode at said second end thereof.

8. An electrically heated catalytic converter for an engine comprising:

a catalyst;

a substrate coated with said catalyst;

a cylindrical casing connected to an exhaust gas passage of an engine, and accommodating said substrate therein;

an electric heater disposed in the casing for heating the substrate;

a rod electrode having a first end and a second end, said first end of the rod electrode being connected to said electric heater, said rod electrode extending from said electric heater and penetrating a wall of said casing disposed adjacent to said second end of the rod electrode, wherein, at least a portion of said rod electrode is formed as a hollow pipe having a hollow space therein and wherein an intermediate part of the hollow pipe portion extending within said casing is squeezed to seal the hollow space inside the intermediate part, wherein the intermediate part is flattened to create a gas-tight seal preventing exhaust gas from entering the hollow pipe portion and wherein the squeezed part of the hollow pipe portion is separated from the first and second ends of the rod electrode; and an electric supply cable inserted and fit into said hollow pipe portion of the rod electrode at said second end thereof.

9. An electrically heated catalytic converter according to claim 8, wherein an intermediate portion of the rod electrode extending from the flattened part of the hollow pipe portion to the electric heater includes a part having increased flexibility with respect to the rest of the intermediate portion of the rod electrode.

* * * * *

UNITED STATES PATENT AND TRADEMARK OFFICE
CERTIFICATE OF CORRECTION

PATENT NO.  : 5,744,104  
DATED       : April 28, 1998  
INVENTOR(S) : Kazuhiro SAKURAI, et al.

Page 1 of 3

It is certified that error appears in the above-indentified patent and that said Letters Patent is hereby corrected as shown below:

Column 1, line 13, change "utilizes" to --utilize--.

Column 1, line 23, delete the period after "engine".

Column 1, line 28, change "heaters." to --heater.--.

Column 2, line 27, change "of" to --in--.

Column 2, line 64, change "FIGS." to --FIG.--.

Column 3, line 13, change "show" to --shows--.

Column 3, line 20, change "is a drawing" to --are drawings--.

Column 4, line 11, change "threreof," to --thereof,--.

Column 4, line 43, delete "an".

Column 6, line 11, change "during" to --when--.

Column 7, line 47, insert a period after "maintained".

Column 8, line 7, insert --and-- before "the".

Column 14, line 7, change "consist" to --consists--.

UNITED STATES PATENT AND TRADEMARK OFFICE
CERTIFICATE OF CORRECTION

PATENT NO. : 5,744,104
DATED : April 28, 1998
INVENTOR(S) : Kazuhiro SAKURAI, et al.

It is certified that error appears in the above-indentified patent and that said Letters Patent is hereby corrected as shown below:

Column 14, line 43, change "an" to --a--.

Column 14, line 45, delete "a".

Column 14, line 59, change "part." to --parts.--.

Column 15, line 16, after "is" insert --formed by--.

Column 15, line 29, change "9," to --9c--.

Column 15, line 33, change "occur" to --occurs--.

Column 15, line 35, delete "since".

Column 16, line 52, change "portion in" to --portions in--.

Column 17, line 19, delete "a" before "strands".

Column 18, line 43, change "is" to --are--.

Column 18, line 47, delete the comma after "inexpensive".

Column 19, line 4, after "connected" insert --to--.

Column 20, line 43, change "improve" to --improves--.

UNITED STATES PATENT AND TRADEMARK OFFICE
CERTIFICATE OF CORRECTION

PATENT NO. : 5,744,104
DATED : April 28, 1998
INVENTOR(S) : Kazuhiro SAKURAI, et al.

It is certified that error appears in the above-identified patent and that said Letters Patent is hereby corrected as shown below:

Column 21, line 36, delete "formed on".

Column 21, line 37, change "shape having a" to --and have--.

Column 23, line 2, insert a period after "whole".

Column 25, line 51, delete "a" before "center".

Signed and Sealed this

Second Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,744,104
DATED : April 28, 1998
INVENTOR(S) : Kazuhiro SAKURAI, Koji SHIMOJI, Tohru YOSHINAGA, and Kiyohiko WATANABE It is certified that error appears in the above-identified patent and that said Letters Patent is hereby corrected as shown below:

Title page:    , item [73] Assignee, should read - - Toyota Jidosha Kabushiki Kaisha, Aichi, Japan and Nippon Soken, Inc., Aichi, Japan - -.

Signed and Sealed this

Fifteenth Day of August, 2000

Attest:

Q. TODD DICKINSON

*Attesting Officer*     *Director of Patents and Trademarks*